(12) United States Patent
Dudkiewicz

(10) Patent No.: US 7,444,660 B2
(45) Date of Patent: Oct. 28, 2008

(54) SYSTEM AND METHOD FOR GENERATING METADATA FOR VIDEO PROGRAMMING EVENTS

(75) Inventor: Gil Gavriel Dudkiewicz, San Francisco, CA (US)

(73) Assignee: Meevee, Inc., Burlingame, CA (US)

( * ) Notice: Subject to any disclaimer, the term of this patent is extended or adjusted under 35 U.S.C. 154(b) by 817 days.

(21) Appl. No.: 09/793,357

(22) Filed: Feb. 26, 2001

(65) Prior Publication Data

US 2002/0152474 A1 Oct. 17, 2002

Related U.S. Application Data

(60) Provisional application No. 60/249,179, filed on Nov. 16, 2000.

(51) Int. Cl.
*H04N 7/10* (2006.01)
*H04N 7/14* (2006.01)
*H04N 5/445* (2006.01)

(52) U.S. Cl. .............................. 725/45; 725/39; 725/46; 725/54

(58) Field of Classification Search .................. 725/46, 725/45, 39, 54
See application file for complete search history.

(56) References Cited

U.S. PATENT DOCUMENTS

| | | | |
|---|---|---|---|
| 4,908,707 A | 3/1990 | Kinghorn | |
| 5,223,924 A | 6/1993 | Strubbe | |
| 5,390,027 A | 2/1995 | Henmi et al. | |
| 5,410,344 A * | 4/1995 | Graves et al. | 725/46 |
| 5,414,455 A * | 5/1995 | Hooper et al. | 725/88 |
| 5,434,678 A | 7/1995 | Abecassis | |
| 5,444,499 A | 8/1995 | Saitoh | |

(Continued)

FOREIGN PATENT DOCUMENTS

EP 0774868 A1 5/1997

(Continued)

OTHER PUBLICATIONS

The TV-Anytime Forum; Requirements Series: R-3 on: Metadata Requirements (Normative); Document: TV037r2; Date: Apr. 7, 2000.

(Continued)

*Primary Examiner*—Chris Kelley
*Assistant Examiner*—Reuben M. Brown
(74) *Attorney, Agent, or Firm*—Foley & Lardner LLP

(57) ABSTRACT

A device for generating metadata for a programming event receives data corresponding to a programming event that includes descriptive information and timing information. The device analyzes the data to determine goodness of fit scores for the programming event corresponding to categories of a classification hierarchy. The device then stores metadata for the programming event that includes goodness of fit scores, time data and descriptive data. The stored goodness of fit scores may be a representative subset of all goodness of fit scores for the programming event. Also disclosed are processes performed in a device for generating metadata for programming events. Also disclosed is metadata encoded in a computer readable medium. The metadata includes a programming event identifier, descriptive data describing the programming event, time data enabling determination of a start time and duration of the programming event, and goodness of fit scores for the programming event that are associated with categories of the classification hierarchy.

12 Claims, 15 Drawing Sheets

U.S. PATENT DOCUMENTS

| | | | |
|---|---|---|---|
| 5,534,911 A | 7/1996 | Levitan | |
| 5,552,833 A | 9/1996 | Henami et al. | |
| 5,585,865 A * | 12/1996 | Amano et al. | 725/46 |
| 5,600,364 A | 2/1997 | Hendricks et al. | |
| 5,619,247 A | 4/1997 | Russo | |
| 5,724,525 A | 3/1998 | Beyers, II et al. | |
| 5,726,702 A | 3/1998 | Hamaguchi et al. | |
| 5,758,257 A * | 5/1998 | Herz et al. | 725/116 |
| 5,758,259 A * | 5/1998 | Lawler | 725/45 |
| 5,767,893 A | 6/1998 | Chen et al. | |
| 5,798,785 A | 8/1998 | Hendricks et al. | |
| 5,818,441 A | 10/1998 | Throckmorton et al. | |
| 5,828,402 A * | 10/1998 | Collings | 725/28 |
| 5,848,396 A | 12/1998 | Gerace | |
| 5,872,588 A | 2/1999 | Aras et al. | |
| 5,878,222 A | 3/1999 | Harrison | |
| 5,920,700 A | 7/1999 | Gordon et al. | |
| 5,924,090 A | 7/1999 | Krellenstein | |
| 5,945,988 A | 8/1999 | Williams et al. | |
| 5,973,683 A | 10/1999 | Cragun et al. | |
| 5,983,237 A | 11/1999 | Jain | |
| 6,005,597 A | 12/1999 | Barrett et al. | |
| 6,005,631 A | 12/1999 | Anderson et al. | |
| 6,011,895 A | 1/2000 | Abecassis | |
| 6,020,882 A * | 2/2000 | Kinghorn et al. | 725/28 |
| 6,061,056 A | 5/2000 | Menard et al. | |
| 6,064,952 A | 5/2000 | Imanaka et al. | |
| 6,088,722 A | 7/2000 | Herz et al. | |
| 6,100,916 A * | 8/2000 | August et al. | 725/28 |
| 6,138,147 A | 10/2000 | Weaver et al. | |
| 6,157,413 A | 12/2000 | Hanafee et al. | |
| 6,163,316 A | 12/2000 | Killian | |
| 6,177,931 B1 | 1/2001 | Alexander et al. | |
| 6,236,395 B1 | 5/2001 | Sezan et al. | |
| 6,240,378 B1 | 5/2001 | Imanaka et al. | |
| 6,295,092 B1 | 9/2001 | Hullinger et al. | |
| 6,425,128 B1 | 7/2002 | Krapf et al. | |
| 6,463,428 B1 | 10/2002 | Lee et al. | |
| 6,486,920 B2 | 11/2002 | Arai et al. | |
| 6,560,678 B1 | 5/2003 | Weissman et al. | |
| 6,567,980 B1 | 5/2003 | Jain et al. | |
| 6,675,384 B1 * | 1/2004 | Block et al. | 725/28 |

FOREIGN PATENT DOCUMENTS

| | | |
|---|---|---|
| JP | 2000175141 | 6/2000 |
| WO | WO 99/29108 | 6/1999 |
| WO | WO 01/73599 | 10/2001 |

OTHER PUBLICATIONS

European Search Report dated Apr. 7, 2005—European Application No. 02791233.6.

* cited by examiner

```
<A name=125TERROR></A><TABLE width="100%" bgColor=#fffff0 borderColorLight=#e0e0e0
border=1><TBODY> <TR> <TD vAlign=top width="30%"><IMG alt="script icon" hspace=5
src="NOON, Tuesday, 10-24-00_files/script.gif" align=left><FONT size=+0><B>INTRO
TERROR</B></FONT><BR><FONT size=-2> </A></FONT> </TD> <TD> <FONT size=-1>IN
WASHINGTON, THE PENTAGON HAS ISSUED A "THREAT CONDITION DELTA."<BR>THAT IS AN ORDER
TO U-S TROOPS TO BE ON THE HIGHEST ALERT, BECAUSE AN ATTACK-- IN THIS CASE A TERRORIST
ATTACK-- COULD BE IMMINENT.<BR>THE ORDER AFFECTS TROOPS STATIONED IN TURKEY AND IN THE
PERSIAN GULF STATES OF BAHRAIN, AND QATAR <BR>THE ORDER COMES IN THE WAKE OF THREATS
THE PENTAGON SAYS U-S INTELLIGENCE RECEIVED AFTER THE ATTACK ON THE U-S-S COLE IN YEMEN.
<BR></FONT></TD></TR></TBODY></TABLE>
<A name=134WORKING_MOMS></A> <TABLE width="100%" bgColor=#fffff0
borderColorLight=#e0e0e0 border=1> <TBODY><TR> <TD vAlign=top width="30%"><IMG
alt="script icon" hspace=5 src="NOON, Tuesday, 10-24-00_files/script.gif" align=left><FONT
size=+0><B>WORKING MOMS</B></FONT><BR><FONT size=-2></FONT> </TD>
<TD><FONT size=-1>IN OTHER NEWS, A NEW STUDY SHOWS THAT NEW MOTHERS ARE GOING BACK
TO WORK MORE QUICKLY THAN EVER.<BR>THE CENSUS BUREAU REPORTS THAT 59 PERCENT OF
WOMEN WHO HAD BABIES WERE BACK ON THE JOB WITHIN A YEAR, USUALLY ON A FULL-TIME
BASIS.<BR>THAT'S UP EIGHT PERCENT FROM TEN YEARS AGO.<BR>AND THE NUMBER OF CHILDREN
AMERICAN WOMEN ARE HAVING CONTINUES TO DECLINE:<BR>THE CENSUS FOUND EACH WOMAN ON
AVERAGE NOW HAS ONE-POINT-EIGHT CHILDREN.<BR>IN 19-76, AMERICAN WOMEN ON AVERAGE HAD
THREE KIDS EACH. <BR></FONT></TD></TR></TBODY></TABLE>
<A name=35SHUTTLE_></A> <TABLE width="100%" bgColor=#fffff0 borderColorLight=#e0e0e0
border=1> <TBODY> <TR> <TD vAlign=top width="30%"><IMG alt="script icon" hspace=5
src="NOON, Tuesday, 10-24-00_files/script.gif" align=left><FONT size=+0><B>SHUTTLE
</B></FONT><BR><FONT size=-2> </FONT> </TD> <TD> <FONT size=-1>AND THE SHUTTLE
DISCOVERY ASTRONAUTS ARE STILL STUCK IN SPACE WAITING FOR AN OPPORTUNITY TO RETURN TO
EARTH.<BR>FOR THE THIRD STRAIGHT DAY, THEY WILL DON THEIR RE-ENTRY SUITS AND TRY TO
BRING THE SHUTTLE HOME. <BR>HIGH WINDS AND RAIN ARE ONCE AGAIN PREVENTING A FLORIDA
LANDING. BUT THE PLAN IS TO BRING DISCOVERY TO CALIFORNIA FOR A DESERT TOUCHDOWN AT
EDWARDS AIR FORCE BASE AT 1:59PM OUR TIME.
<BR></FONT></TD></TR></TBODY></TABLE>
```

```
// PG              |Talent|SLUG          |TM |TN |Shot    |Video  |Total| Out cue    |Back Time
/////////////////////////////////////////////////////////////////////////////////////////////////
125TERROR         |      |INTRO TERROR  |   |   |2-shot  |On Set |2:23 | 58:45  (:15)| 0:02:26a|
134WORKING_MOMS   |S/D   |WORKING MOMS  |   |   |2-shot  |On Set |0:25 | 58:45  (:15)| 0:02:54a|
35SHUTTLE         |      |SHUTTLE       |   |   |2-shot  |On Set |0:26 | 58:45  (:15)| 0:03:33a|
22WEATHER         |      |WEATHER       |   |   |2-shot  |On Set |2:41 | 58:45  (:15)| 0:06:27a|
161HOMETOWN_HERO  |      |HOMETOWN HERO |   |   |2-shot  |On Set |0:51 | 58:45  (:15)| 0:07:21a|
164SURPLUS        |      |SURPLUS       |   |   |2-shot  |On Set |0:17 | 58:45  (:15)| 0:07:41a|
160CRANES         |      |CRANES        |   |   |2-shot  |On Set |0:22 | 58:45  (:15)| 0:08:06a|
132SC_LIVE_WAGE   |S/D   |SC LIVE WAGE  |   |   |2-shot  |On Set |0:23 | 58:45  (:15)| 0:08:32a|
135LOTTO_WINNERS  |      |LOTTO WINNERS |   |   |2-shot  |On Set |0:53 | 58:45  (:15)| 0:09:26a|
```

METADATA

| Field | Data |
|---|---|
| Program_ID | EP07071974-LAHOYASINGS |
| Program_Name | Channel 2 Nightly News at 11:00 |
| Program_Description | Local NFL Team Report; Buffalo Bills training camp opens; interview with coach; interviews with players |
| Program_Reduced_Description | Buffalo Bills training camp |
| Program_Date | 25 July 2000 |
| Program_Start_Time | 23:12:30 (HH:MM:SS) |
| Program_Duration | 00:02:10 (HH:MM:SS) |
| Channel_ID | 2 |
| Program_Type | Program segment |
| Program_TV_Rating | |
| Program_MPAA_Rating | |
| Message_Status | Retransmission of evening news segment |
| Category_List | News/Local/Sports/Football/NFL,100; Sports/Football/NFL/AFC/Bills,100; Sports/Football/NFL/Training_Camp,85; Sports/Football/NFL/News_Commentary,35 |
| Keyword_List | Football; Buffalo; Bills; Training Camp |

Figure 7

VIEWER PROFILE

| Field | Data |
|---|---|
| Profile_ID | PROF1 |
| Profile_Name | Football Fan |
| Profile_Description | Identifies programs about my favorite team. |
| Profile_Priority | 1 |
| Profile_Alerts_Per_Hour | 2 |
| Profile_Alert_Minutes_In_Advance | 2 |
| Profile_Activation_Time | 12:00:00 – 00:00:00 |
| Category_Scores | News/Local/Sports/Football/NFL,6; Sports/Football/NFL/AFC/Bills,10; Sports/Football/NFL/Training_Camp,10; Sports/Football/NFL/Commentary,4 |

Figure 11

SYSTEM AND METHOD FOR GENERATING METADATA FOR VIDEO PROGRAMMING EVENTS

CONTINUING DATA

This application claims priority under 35 USC §119(e) from U.S. Provisional Application Ser. No. 60/249,179, filed Nov. 16, 2000, the entirety of which is incorporated herein by reference.

FIELD OF THE INVENTION

Embodiments of the invention relate to technologies that enable the identification of programming events of interest to a viewer.

BACKGROUND TECHNOLOGY

Television viewers are presently able to access hundreds of channels providing a multitude of programs, only a small fraction of which will be of interest to a given viewer. To assist the viewer in determining programs of interest, current commercially available reception devices such as televisions, analog cable receivers, and digital cable and satellite receivers typically provide a program guide function that allows the viewer to access a grid showing programs that will be available on various channels in upcoming time slots. Brief descriptions of programs may also be accessible. Such receivers may also allow the user to search for programs in basic categories such as news, sports, movies, etc.

Current commercially available television recording technology also provides similar tools. The present generation of digital video recording machines, which typically store video on a bulk storage device such as a hard disk drive, allow users to select programs for recording using an on screen program guide that provides key word searching of program titles, a program time grid, and basic program categorization.

Although these devices provide tools that improve over devices of earlier generations, most conventional tools still require viewers to examine all upcoming programs to identify programs of interest. Thus, developers of the next generation of devices are focused on providing intelligence in receiving and recording devices for identifying programs of interest on behalf of the user. A number of U.S. patents describe different approaches to this problem.

U.S. Pat. No. 5,223,924 describes a device that downloads program descriptions. The program descriptions are viewed individually by a user, who indicates whether he is interested in each program. Based on the user's input, the device builds a database of key words associated with the user's positive and negative preferences. This database is then used to identify upcoming programs that may be of interest to the user.

U.S. Pat. No. 5,410,344 describes a device that stores a viewer preference file that reflects the viewer's positive and negative preferences concerning various program attributes. The device uses the preference file to analyze content codes that describe attributes of available programs, and presents a program to the user based on the analysis. Programs are ranked using a neural network thresholding method.

U.S. Pat. No. 5,434,678 and its related patents describe a video retrieval system in which individual portions of scenes within a video are rated in accordance with a rating system and a version of the video is presented by selecting the segments that are acceptable based on a user's content preferences. Similar technology is described in U.S. Pat. No. 5,717,814 and its related patents.

U.S. Pat. No. 5,444,999 describes a device that tracks the viewing habits of a user and builds a weekly viewing trend. The device notifies the viewer when the television is tuned to different channel in conflict with the viewing trend.

U.S. Pat. No. 5,534,911 describes a system in which a viewer builds a personal profile that is then used to analyze data describing available programs. Programs are selected based on the analysis and are made available on a personalized virtual channel. The viewer is also enabled to select from among programs that are ranked in accordance with the profile. The specific manner in which program analysis is performed is not described.

U.S. Pat. No. 5,585,865 describes a system that searches for a genre code in broadcast signals in accordance with a specified program genre. If more than one signal contains the desired genre code, the system displays the channel with the greatest display history.

U.S. Pat. No. 5,61 9,247 describes a video recording device that selects programs for storage based on predefined user preferences, and allows a user to view the stored programs on a pay-per-view basis.

U.S. Pat. No. 5,767,893 describes a system that uses content based filtering for identifying video programs to be stored. The specific manner in which content is filtered is not described.

U.S. Pat. No. 5,878,222 describes a system that monitors channel data describing contents of available channels and arbitrates access to display or storage resources based on a user profile.

U.S. Pat. No. 5,945,988 describes a system that monitors the programs viewed by a current viewer and determines the identity of the current viewer using stored viewer profiles. The system may then use the viewer profile to analyze metadata describing upcoming programs to identify programs for viewing or recording. The specific manner in which the metadata analysis is performed is not described.

U.S. Pat. No. 6,088,722 describes a system in which a user profile is compared to program content profiles to generate an agreement matrix for each program. The agreement matrixes are used to select a program for presentation to the viewer. Agreement matrixes may also be generated at a server end using profiles for multiple viewers to select programs to be made available from the server.

SUMMARY OF THE INVENTION

One shortcoming of the conventional technology as described above is that programs must be evaluated on a whole-program basis. However, many programs address diverse subjects, some of which will be of interest to a particular viewer and some of which will not. Embodiments of the invention address this problem through devices and processes for generating metadata for individual program segments, thus allowing program segments to be treated as individual programming events that can be individually evaluated by the user or by user equipment. Related embodiments of the invention are applicable to programs such as news broadcasts that are multi-segmented and are typically not described in detail in conventionally available information sources because their contents are typically not known until shortly before broadcast. In accordance with embodiments of the invention, the production data used to produce such programs may be processed to generate metadata for the individual segments of the program and to distribute that metadata to consumers in advance of the airing of the program.

A further shortcoming of the conventional technology is that program classification is limited to broadly defined subject categories that are typically not easily compared to an individual viewers' personal tastes. For example, conventional technology may be capable of classifying programs as being within the category of "sports." However, for the viewer who is only interested in a particular sport, or a particular team, such classification is not effective in identifying programs of particular interest. Embodiments of the invention address this problem through the use of a content classification hierarchy for classifying the content of programming events and for defining viewer's particular interests. The classification hierarchy is comprised of trees of subject categories of increasing specificity. This allows programming events to be classified with a previously unattainable degree of specificity, and allows viewer preferences to be expressed with equal specificity, both to emphasize particular categories of interest and to exclude categories not of interest. For example, rather than simply being enabled to specify interest in "sports", a viewer may specify that he is interested in football and tennis but not basketball or baseball, and may further express interest in particular football teams. Thus, devices may evaluate programming events that are rated according to the classification hierarchy, using viewer profiles defined according to the same classification system, and the resulting evaluations reflect actual user preferences much more accurately than if conventional general categories were used. Further, among multiple programs that are evaluated as being of interest to a viewer, the degree of specificity of the matches provides a manner of ranking those programs based on viewer preferences.

The use of hierarchical classification as described above enables intelligent identification of programming events that will be of particular interest to a given viewer. This intelligence may be implemented to automatically record programming events of interest, to alert a viewer of upcoming programming events of interest, to automatically display programming events of interest as they become available, or to selectively provide programs to the viewer. When this intelligence is coupled with metadata describing individual program segments as described above, it becomes possible to provide the viewer with a truly personalized viewing experience, from which all uninteresting subject matter has been eliminated through deep content specific filtering at the program segment level.

Embodiments of the invention may pertain to a system that provides evaluation of individual segments of a video program in accordance with a viewer's viewing preferences. The system included a server that receives production data for a program including descriptive information and timing information, and that generates individual metadata for each program segment. The system further includes a client device that receives the individual metadata and processes the metadata in accordance with a viewer profile to determine the desirability of each program segment for the viewer. The client device may record desirable segments or alert the viewer about desirable segments. The server may provide the metadata to the client through a programming event transmission system or through the internet. The metadata and viewer profile may utilize a classification hierarchy.

Further embodiments of the invention may pertain to a device for generating metadata for video program segments. The device receives production data for a program that includes descriptive information and timing information, determines time data and descriptive data for individual segments of the program, and generates individual metadata corresponding to each program segment. Each metadata comprises an identifier of the program, and time data and descriptive data for the program segment. The individual metadata for each segment of the program enables separate evaluation of each program segment with respect to a given viewer's viewing preferences. The metadata may utilize a classification hierarchy. Related embodiments may pertain to processes performed in a device for generating metadata for program segments.

Further embodiments of the invention may pertain to a device for providing metadata for segments of a video program to consumers. The device obtains production data for a program from production equipment in a production studio where the program is produced. The production data is provided to a metadata generator, which returns individual metadata corresponding to individual segments of the program. The individual metadata are provided for transmission through a programming event transmission system in advance of the corresponding program segments. The individual metadata enable separate evaluation of each program segment with respect to a given viewer's viewing preferences. The metadata may be encoded for transmission and may utilize a classification hierarchy. Related embodiments may pertain to processes performed in a device for providing metadata for segments of a video program to consumers.

Further embodiments of the invention may pertain to a system for evaluating video programming events in accordance with a viewer's viewing preferences. The system includes a server that generates individual metadata for individual programming events. The metadata comprises time data and descriptive data for a programming event, and goodness of fit scores for the programming event that are associated with categories of a classification hierarchy. The system further includes a client device that receives the individual metadata and processes the individual metadata in accordance with a viewer profile to individually determine the desirability of each programming event. The viewer profile includes preference scores associated with categories of the classification hierarchy. The client device may be a recording device that selectively records programming events based on the desirability determined for each programming event. The client device may be alternatively be a display device such as a set top box, computer or television that selectively alerts a viewer to the availability of upcoming programming events based on the desirability determined for each programming event. The server may receive production data for a program and generate individual metadata corresponding to segments of the program. The metadata may be provided for transmission through a programming event transmission system, or may be made available through the internet.

Further embodiments of the invention may pertain to a device for generating metadata for a programming event. The device receives data corresponding to a programming event that includes descriptive information and timing information. The device analyzes the data to determine goodness of fit scores for the programming event corresponding to categories of a classification hierarchy. The device then stores metadata for the programming event that includes goodness of fit scores, time data and descriptive data. The stored goodness of fit scores may be a representative subset of all goodness of fit scores for the programming event. Related embodiments may pertain to processes performed in a device for generating metadata for programming events. Further related embodiments may pertain to metadata encoded in a computer readable medium. The metadata includes a programming event identifier, descriptive data describing the programming event, time data enabling determination of a start time and duration of the programming event, and goodness of fit scores for the programming event that are associated with categories of the classification hierarchy.

Further embodiments of the invention may relate to a device for determining the desirability of programming events. The device receives metadata for programming events and determines a desirability of each of said programming events with respect to viewing preferences represented in one or more viewer profiles. The metadata includes goodness of fit scores associated with categories of a classification hierarchy, and the viewer profiles include preference scores associated with categories of the classification hierarchy. The device determines a desirability of each of said programming events with respect to viewing preferences represented in the viewer profiles using the metadata. The device may determine the desirability of a programming event by determining categories of the classification hierarchy for which there is a goodness of fit score in the metadata of the programming event and a preference score in one or more of the viewer profiles, and then determining a desirability score for the programming event as a function of the goodness of fit scores and preference scores of the matched categories. That function may be weighted in accordance with the specificities of the matched categories. The device may determine the desirability score for a programming event by determining a score for each matched category that is a function of the goodness of fit score and a preference score of each category in a branch of the hierarchy terminating in the matched category, and then determine a maximum score among the matched category scores. The preference score of each category in a branch of the hierarchy may be weighted in accordance with its ordinal level within the hierarchy. Alternatively, the device may determine a desirability score for a programming event by determining a score for each matched category that is a function of the goodness of fit score and a preference score for the matched category in each of the viewer profiles that is weighted in accordance with a priority of the respective viewer profile, and then determine a maximum score among the matched category scores. Alternatively, the device may determine a desirability score for a programming event by determining a score for each matched category that is function of the goodness of fit score, the preference score in each of the viewer profiles for the matched category, and a specificity weight of the matched category, and then determining a maximum score among the matched category scores. The metadata may include time data that enables determination of a time and duration of a programming event, and the device may determine a schedule of preferred programming events in accordance with desirability scores and times and durations of programming events. The device may alert a viewer of the availability of a programming event in the schedule, or may record programming events in accordance with the schedule. Related embodiments may pertain to processes performed in a device for determining the desirability of programming events. Further related embodiments may pertain to viewer profile encoded in a computer readable medium. The viewer profile includes a profile identifier and preference scores associated with categories of the classification hierarchy. The viewer profile may further include an activation time, a priority of the viewer profile relative to other viewer profiles, contact information indicating where a programming event alert should be sent for that viewer, or an amount of time in advance of a programming event for providing an alert regarding that programming event to the viewer.

Further embodiments of the invention pertain to a device for providing alerts to a viewer concerning programming events. The device determines preferred programming events from among available programming events using programming event metadata and a viewer profile. The metadata includes goodness of fit scores associated with categories of a classification hierarchy and the viewer profile includes preference scores associated with categories of the classification hierarchy. The device provides an alert concerning a preferred programming event to a communication device of the viewer. The alert may be provided by sending data to a set top box, a computer, a pager, an email address, or a wireless communication device. The alert may be provided in accordance with contact information contained in the viewer profile. The device may determine a time in advance of the preferred programming event for providing the alert from information in the viewer profile specifying an amount of time in advance for providing alerts, and then provide the alert at the determined time. Related embodiments of the invention may pertain to processes performed in a device for providing alerts to a viewer concerning programming events.

Further embodiments of the invention may relate to a device for providing programming events to viewers. The device determines a preferred programming event from among available programming events using programming event metadata and one or more viewer profiles. The metadata includes goodness of fit scores associated with categories of a classification hierarchy and the viewer profiles include preference scores associated with categories of the classification hierarchy. The device provides preferred programming events to viewers in accordance with the desirability determinations. The device may notify a viewer of a preferred programming event, and provide the programming event in response to a request from the viewer to receive the programming event. The device may determine the desirability of a programming event by determining categories of the classification hierarchy for which there is a goodness of fit score in the metadata of the programming event and a preference score in one or more of the viewer profiles, and then determining a desirability score for the programming event as a function of the goodness of fit scores and preference scores of the matched categories. That function may be weighted in accordance with the specificities of the matched categories. The device may determine the desirability score for a programming event by determining a score for each matched category that is a function of the goodness of fit score and a preference score of each category in a branch of the hierarchy terminating in the matched category, and then determining a maximum score among the matched category scores. The preference score of each category in a branch of the hierarchy may be weighted in accordance with its ordinal level within the hierarchy. Alternatively, the device may determine a desirability score for a programming event by determining a score for each matched category that is function of the goodness of fit score and a preference score for the matched category in each of the viewer profiles that is weighted in accordance with a priority of the respective viewer profile, and then determining a maximum score among the matched category scores. Alternatively, the device may determine a desirability score for a programming event by determining a score for each matched category that is function of the goodness of fit score, the preference score in each of the viewer profiles for the matched category, and a specificity weight of the matched category, and then determining a maximum score among the matched category scores.

The following description of preferred embodiments discloses a variety of additional features that may be implemented in conjunction with the various embodiments summarized above and in further combinations that will be apparent to those having ordinary skill in the art.

BRIEF DESCRIPTION OF THE DRAWINGS

The invention can be better understood with reference to the following figures. The components in the figures are not necessarily to scale, emphasis instead being placed upon illustrating the principles of the embodiments of invention described in conjunction therewith.

FIG. 3 illustrates an example of production data comprising HTML script data produced by a conventional production application;

FIG. 4 illustrates an example of production data comprising rundown data produced by a conventional production application;

FIG. 7 illustrates metadata in accordance with an embodiment of the invention;

FIG. 11 illustrates a viewer profile in accordance with an embodiment of the invention;

DESCRIPTION OF PREFERRED EMBODIMENTS

In the following description, various aspects of the present invention are described, and various details are set forth to provide a thorough understanding of the present invention and examples of manners in which it may be made and used. However, it will be apparent to those skilled in the art that the present invention may be practiced with only some of the aspects described. Further, while various operations are described as multiple discrete steps performed in a particular order, the order of description should not be construed as to imply that the operations must be performed in the order they are presented. Further, in some instances, well known features are omitted or simplified in order not to obscure the description. In this description, the use of phrases such as "an embodiment," "embodiments," "preferred embodiments" and so forth do not necessarily refer to the same embodiment or all embodiments, although they may.

The following description employs the terms "program," "program segment" and "programming event." These terms are used to describe different but related concepts. The term "program" is used in the conventional sense of a video program such as a television program. For purposes of this description, a program comprises one or more "program segments" that pertain to different subjects and therefore can stand on their own as individual complete viewing experiences. Examples of programs that typically consist of a single programming segment are movies, sit-coms, and sporting events. Examples of programs that are typically comprised of multiple program segments are news broadcasts, news magazine shows that present multiple feature stories, sports highlight shows, music video shows, informational shows, and variety shows.

The term "programming event" is used in this description to describe a distinct video production presentation that pertains to a particular subject and therefore stands on its own as a complete viewing experience. Therefore, a given programming event may be a program segment, or it may be a whole program if that program consists of only one program segment.

Figure 1:
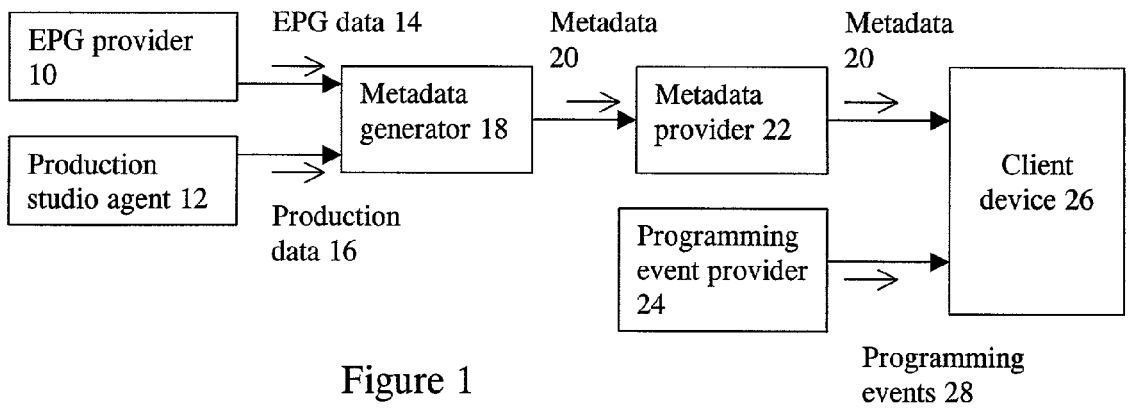
FIG. 1 illustrates a system for providing metadata and programming events to a client device in accordance with an embodiment of the invention.

FIG. 1 provides an overview of a programming event distribution system in accordance with embodiments of the invention. Referring to FIG. 1, a metadata generator 18 generates metadata 20 that is descriptive of a video programming event. The metadata generator 18 is typically implemented as a computing device including a processor or processors to execute programming instructions and memory coupled to the processor(s) and containing programming instructions for instantiating a metadata generator system, details of which are described below. The metadata 20 is provided by a metadata provider 22 to a client device 26 maintained by a viewer. The client device 26 also receives programming events 28 from a programming event provider 24. In various embodiments, the metadata provider 22 and programming event provider 24 may be a single entity such as a television broadcasting station or a cable or satellite television provider. In other embodiments, the metadata provider 22 and the programming event provider 24 may be separate entities. For example, the metadata provider 22 may be an internet server, whereas the programming event provider 24 may be a television broadcasting station or a cable or satellite television provider. The metadata 20 provided by the metadata generator is typically received by the client device 26 in advance of corresponding programming events 28 to allow sufficient time for processing of the metadata in order to evaluate the desirability of upcoming programming events to the viewer.

The metadata generator 18 generates metadata 22 that describes programming events in a standard format that may be processed by the client device 26. Metadata typically comprises delimited data associated with fields in a generic metadata format, and typically includes at least data describing the subject of a programming event and data describing the time and duration of the programming event.

The metadata generator 18 may receive as input conventional electronic program guide (EPG) data 14 that is provided by a commercial EPG provider 10. Current providers of conventional EPG data are Tribune TV, TV Data, and TV Guide. The conventional EPG data describes television programs through information such as the program title, program start time, and program duration. EPG data may also include a program subject description if the program is one that is produced, or capable of being described, significantly in advance of its transmission. Typical examples of programming events for which EPG data contains subject descriptions include movies, sit-coms, and sporting events.

The metadata generator 18 may also receive production data 16 from a production studio agent 12 that obtains the production data from production equipment of a production studio. The production studio agent 12 is typically implemented as a computing device including a processor or processors to execute programming instructions and memory coupled to the processor(s) and containing programming instructions for instantiating a production studio agent system, details of which are described below. Production data 16 provided by the production studio agent 12 generally includes data that is used in the production of a program, such as scripts, cue sheets, schedules, rundowns, closed caption text, editing information, as so forth. Unlike conventional EPG data, production data used in accordance with the invention includes descriptive information (scripts, segment titles, segment descriptions, etc.) that is associated with timing information, thus enabling individual program segments within a program to be identified and individually described with respect to both their subjects and their times and durations. Thus, production data enables the generation of metadata for individual program segments, and as a result, program segments such as individual news stories, variety show skits and so forth may be individually analyzed.

Production data is typically stored in computer systems and may exist in a variety of formats. Examples of conventional software applications that generate production data include the Associated Press Electronic News Production System (ENPS), iNEWS, Avstar, and NewsCenter production software.

FIG. 3 shows an example of production data generated by the conventional ENPS system. The production data of FIG. 3 includes script data that is formatted as HTML code. Within the HTML code are individual sections corresponding to individual segments of a news broadcast. These segments are demarcated by tags having the format<A name=_>, examples of which are highlighted in FIG. 3 for purposes of illustration. FIG. 4 shows a further example of production data generated by the conventional ENPS system. The production data of FIG. 4 comprises "rundown" data that provides a duration and ending time of individual segments within a news broadcast. The rundown data of FIG. 4 corresponds to the script data of FIG. 3, and it will be seen by comparison of the Figures that a common set of identifiers is used for identifying segments in the script data and in the rundown data. Thus, for example, the segment identified as "125TERROR" in the HTML script data can be seen in the rundown data to have a total time of 2:23 and an ending time of 2:26 into the news broadcast. Although the data in FIGS. 3 and 4 pertain to a program for in which individual segments are described by single sections in the HTML data and rundown data, other programs may have individual segments that are described by multiple sections in the HTML data and rundown data, for example, when the segment consists of multiple distinct "live" and video portions. Thus the production data of FIGS. 3 and 4 is meant to be exemplary and not descriptive of all production data. Further, the production data of FIGS. 3 and 4 is representative only of data produced by one conventional production system, and a variety of other data formats will be known to those familiar with video production applications.

Since production data may exist in a variety of types and formats, it is preferable that the metadata generator 18 includes a production data standardization agent that receives production data from the studio agent 12 in its various native formats and processes the production data 16 into a standardized delimited form. Alternatively, the production studio agent 12 may provide standardization functions. In the metadata generator 18, the production data 16 is preferably processed together with any available EPG data to generate metadata for individual programming events.

Figure 2:
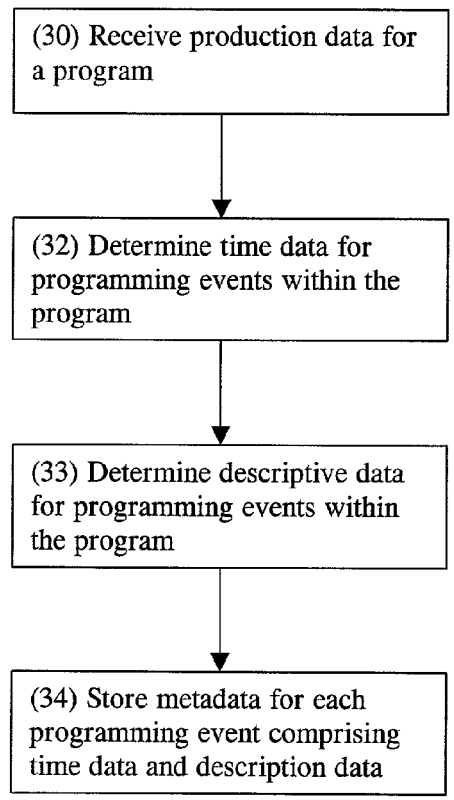
FIG. 2 illustrates a process in a system such as the system shown in FIG. 1.

Processing performed in a metadata generator in accordance with embodiments of the invention is illustrated in FIG. 2. For purposes of illustration, the tasks performed in the process of FIG. 2 will be related to the production data of FIGS. 3 and 4. Initially, the metadata generator receives production data for a program (30). The production data includes timing data and descriptive data for the program, such as is contained in the HTML script data and rundown data of FIGS. 3 and 4. The received production data may be processed to conform to a standard delimited format, for example, by tagging using an appropriate set of XML tags. Referring to FIGS. 3 and 4, the HTML data of FIG. 3 may be parsed into script data for individual segments by examining the contents of delimiting tags such as the<A name=_> tag and extracting all text data associated with the same or related identifiers. Similarly, the rundown data may be parsed into rundown data for individual segments by searching for delimiting data or characters and extracting Total and Back Time data associated with the same or related identifiers.

The production data is then processed to determine time data of programming events within the program (32). Time data is data that enables determination of when the segment begins and ends, and may comprises beginning and ending times, a beginning time and duration, or an ending time and duration. Referring to the rundown data of FIG. 4, time data for segments may be determined through reference to the Total time and Back time associated with each identifier. For example, if the program represented by FIG. 4 is a 12 noon news program, the ending time of the segment may be determined by adding the latest Back Time for the segment to the 12 noon start time of the program, and the starting time may be determined by subtracting the Total time from the ending time. The production data is also processed to determine descriptive data for each programming event (33). This may be done before, after, or contemporaneously with the determination of time data. Descriptive data may be determined through reference to script data as shown in FIG. 3. For example, key words and descriptive phrases may be extracted from the script data. Metadata for the programming events is then generated and stored (34). The metadata for each programming event comprises at least time data and descriptive data. EPG data and other types of production data may also be processed to generate time data and descriptive data.

Although the process of FIG. 2 was described as occurring within a metadata generator, in alternative embodiments the task of parsing production data into a standard delimited format for individual programming events may be performed by the production studio agent. In such embodiments, the production data is provided to the metadata generator in a standard delimited form, such as an XML document.

Figure 5:
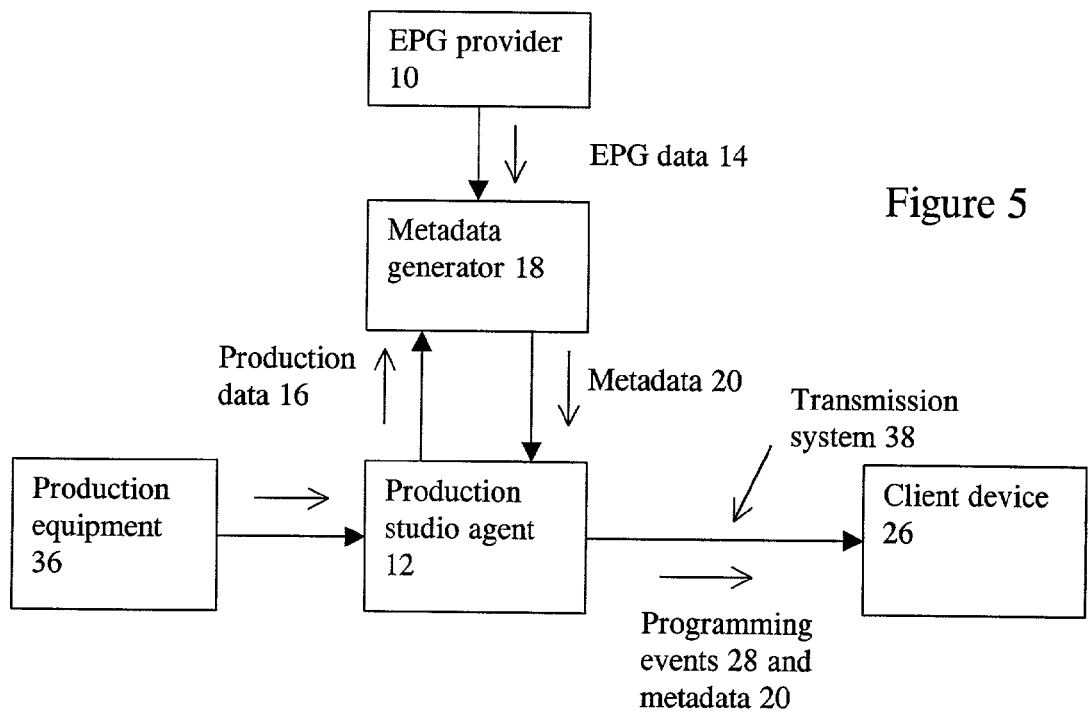
FIG. 5 illustrates a system for providing metadata and programming events to a client device in accordance with an embodiment of the invention.

As described with respect to FIG. 1, metadata may be provided to consumers by a provider of programming events or by an independent metadata provider. FIG. 5 illustrates an embodiment of the system illustrated in FIG. 1 in which programming events occurring within a multi-segment program such as a live local news broadcast are provided through a transmission system in common with the programming events. In this embodiment, a metadata generator 18 receives production data 16 from a production studio agent 12 that obtains production data from production equipment 36 in the studio where the program is produced. The metadata generator 18 may be local or remote with respect to the production studio agent 12. In typical implementations, the metadata generator 18 is connected to the production studio agent 12 through a data network such as a LAN, WAN, or the internet. The metadata generator 18 may also receive EPG data 14 from an EPG provider 10. EPG data may likewise be received through a data network. The metadata generator 18 generates metadata 20 for each segment of the program from the production data, and optionally also from the EPG data. Metadata 20 for each programming event within the program is then provided from the metadata generator 18 to the production studio agent 12, where it is provided for transmission in common with programming events through a broadcast system 38, such as RF airwaves or cable or satellite distribution systems, for reception by a client device 26. The metadata may then be transmitted to client devices, in the case of a production studio agent at a broadcast studio location such as a local television station. Alternatively, the metadata may be provided to a programming event provider for transmission to client devices.

A variety of coding standards may be used for encoding the metadata, such as the Harris Communication, Divicom, and NDS standards. Metadata may be transmitted in the vertical blanking interval of the video signal. Alternatively, where programming events are broadcast using MPEG-2 digital video, the metadata may be encoded in the text portion defined by the MPEG-2 standard. The metadata for a given programming event is preferably transmitted sufficiently in advance of corresponding programming events to allow time for processing of the metadata by client devices.

Figure 6:
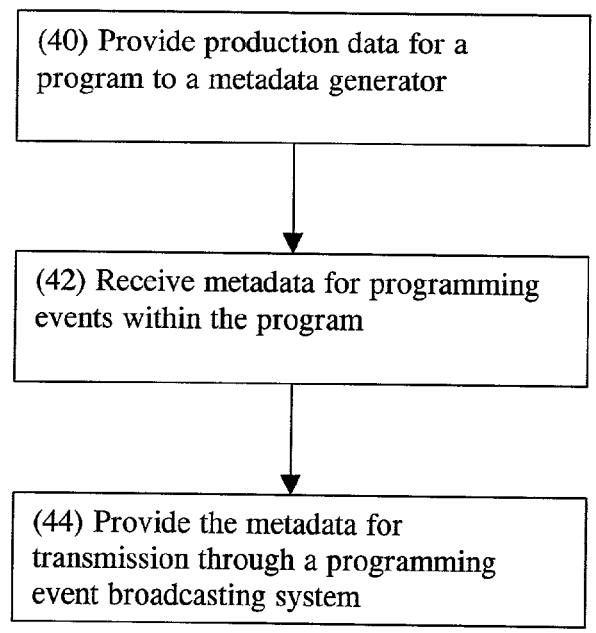
FIG. 6 illustrates a process in a system such as the system shown in FIG. 5.

Processing occurring in the studio agent of FIG. 5 is described in FIG. 6. In accordance with FIG. 6, the studio agent provides production data for a program to a metadata generator (40). The production data typically includes descriptive information that is associated with timing information. The studio agent then receives metadata for individual programming events within the program (42). The studio agent then provides the metadata for transmission through a programming event transmission system (44). The metadata may encoded using an encoding standard such as described above.

FIG. 7 shows an example of a logical organization of metadata for a programming event in accordance with preferred embodiments of the invention. The illustrated metadata describes a segment of a local news broadcast relating to an NFL team. The metadata is comprised of delimited descriptive data associated with fields of a generic metadata format. A Program_ID field provides a unique identifier for each programming event. A Program_Name field provides the name of the program with which the programming event is associated. A Program_Description field provides a description of the programming event, and a Program_Reduced_Description field provides a shortened description. Fields for Program_Date, Program_Start_Time and Program_Duration provide information identifying when and for how long the programming event is aired. A Channel_ID field identifies the channel on which the programming event will be received. A Program_Type field describes the type of programming event, such as a program, a program segment, or a movie. Program_TV_Rating and Program_MPAA_Rating fields provide ratings assigned to the program by rating services. A Message_Status field indicates whether the programming event is a first transmission, a retransmission, or an updated transmission. A Category_List field provides goodness of fit scores for the programming event with respect to categories in a classification hierarchy as described further below. A Keyword_List field contains key words describing the subject matter of the programming event. The metadata is preferably formatted in a standard delimited format, for example, as an XML document using appropriate tags.

Figure 8:
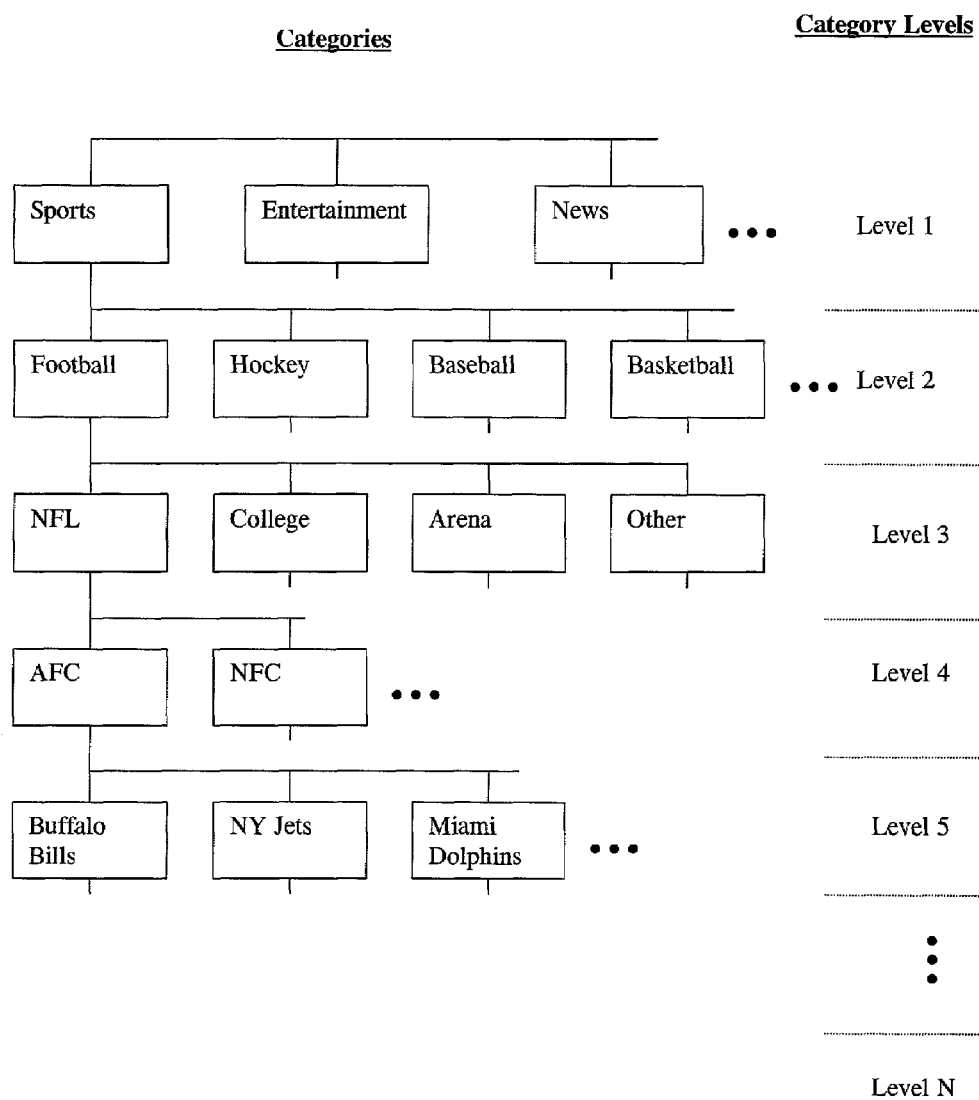
FIG. 8 illustrates a portion of a classification hierarchy in accordance with an embodiment of the invention.

The classification hierarchy with respect to which the programming event is scored comprises a hierarchy of subject categories. FIG. 8 illustrates a portion of an exemplary classification hierarchy in accordance with embodiments of the invention. At the top level of the hierarchy are general subject categories such as Sports, Entertainment, News, etc. Extending from each of the top level categories is a tree of more specific subject categories that fall within the top level category. FIG. 8 particularly illustrates a branch within the hierarchy in which Football is one of several categories within Sports, NFL is one of several categories within Football, AFC is one of several categories within NFL, and Buffalo Bills is one of several categories within AFC.

In the classification hierarchy of FIG. 8, the categories are shown as being organized in common ordinal levels, such that all categories at the top level of the hierarchy are at Level 1, all categories depending from Level 1 categories are at Level 2, and so forth. Embodiments of the invention may treat the common ordinal level of a category as being representative of that category's specificity relative to other categories of the classification hierarchy. However, since the degree of specificity of categories at a given ordinal level may vary among branches of the hierarchy, alternative embodiments may represent specificity in other manners. For example, each category may be assigned individual specificity scores, or all categories depending from a given category in the hierarchy may be commonly assigned a particular specificity score.

Figure 9:
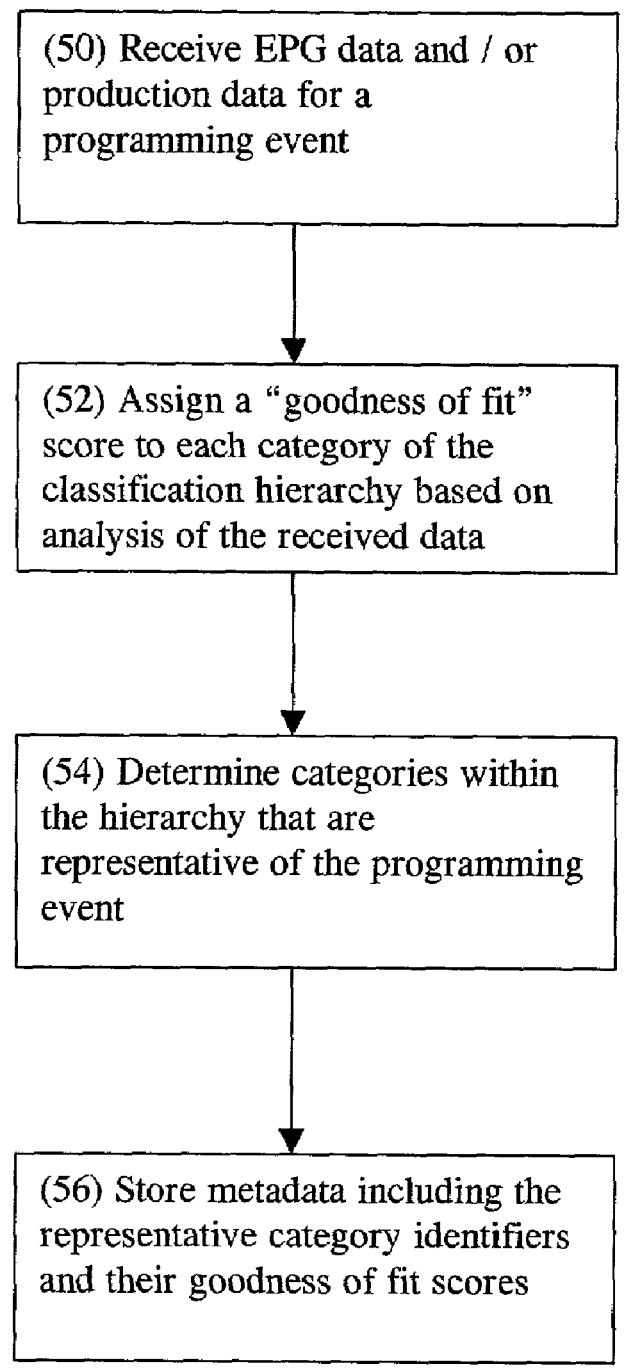
FIG. 9 illustrates a process for generating metadata in accordance with an embodiment of the invention.

In accordance with preferred embodiments of the invention, metadata generators such as those of FIGS. 1 and 5 produce metadata such as shown in FIG. 7 by processing descriptive data concerning a given programming event to classify the subject of the programming event using a classification hierarchy such as the one shown in FIG. 8. An example of processing performed by a metadata generator to produce metadata for a programming event in accordance with an embodiment of the invention is illustrated in FIG. 9. Initially, the metadata generator receives data for analysis that relates to a programming event (50). The received data may include EPG data and production data. Where the received data is production data, that data is preferably processed by a standardization agent that converts the production data to a standard delimited format for further processing. The data may also be parsed to determine individual programming events within a program. The data is then analyzed and a goodness of fit score for the programming event is assigned with respect to each category of the classification hierarchy (52). A goodness of fit score indicates how well the particular category describes the subject matter of the programming event. Goodness of fit scores may be generated using an appropriately configured classification application. For example, the InterMedia media searching tool produced by Oracle Corporation may be configured to define a thesaurus reflecting the categories of the classification hierarchy, such that EPG and production data for a programming event may be searched with respect to each category of the hierarchy to generate a list of matched categories with associated confidence scores in a range from 1% to 100%. The confidence score for each matched category is used as that category's goodness of fit score, and categories having no match are treated as having goodness of fit scores of zero.

After assigning goodness of fit scores (52), the metadata generator determines a set of categories within the hierarchy that are representative of the programming event (54). In the preferred embodiment, the metadata generator first determines for each branch of the classification hierarchy the most specific category that has non-zero goodness of fit score. For example, referring to the classification hierarchy of FIG. 8, if the category Buffalo Bills is assigned a goodness of fit score of 75%, the higher level categories in its branch will also have non-zero goodness of fit scores; however, Buffalo Bills is the most specific category having a non-zero score in its particular branch of the hierarchy. The metadata generator then determines additional representative categories by examining the differences in the goodness of fit scores of the most specific categories and their parent categories. In preferred embodiments, the parent category is determined to be an additional representative category if the difference between its score and its corresponding most specific category exceeds a predetermined amount or percentage. Determination of such parent categories serves to identify instances in which it is desirable to supplement or qualify the representative information conveyed by the score of a most specific category.

Once determined, the identifiers and associated goodness of fit scores of the representative categories are stored in delimited fashion (56). Other data is also generated through processing of the EPG and production data and is stored together with the goodness of fit scores in delimited fashion to comprise metadata for the programming event. The other data referred to here may comprise data such as is shown in the exemplary metadata of FIG. 7, such as description, time, duration, key words, etc. A variety of storage formats are available for storing the metadata. For example, the metadata may be stored as an XML document using appropriate tags for indicating the various types of data within the metadata.

Although the goodness of fit scores in the aforementioned embodiments are confidence scores taken directly from a classification tool, in alternative embodiments it may be desirable for business purposes to adjust the goodness of fit scores for particular programming events before they are stored in metadata. For example, goodness of fit scores may be raised so that that analysis of the goodness of fit scores will be biased in favor of those programming events as compared to other programming events.

As described above with respect to FIGS. 1 and 5, metadata for programming events may be distributed to client devices, where it may then be processed by a client device to automatically determine programming events that are desirable for viewing or storage. The client device is preferably a video storage device that is used in association with a video display device such as a television for reception, display and storage of video. However, embodiments of the invention may be implemented in a variety of other types of client devices including set top boxes, personal computers, video display devices such as televisions, wireless communication devices, and personal digital assistants.

Figure 10:
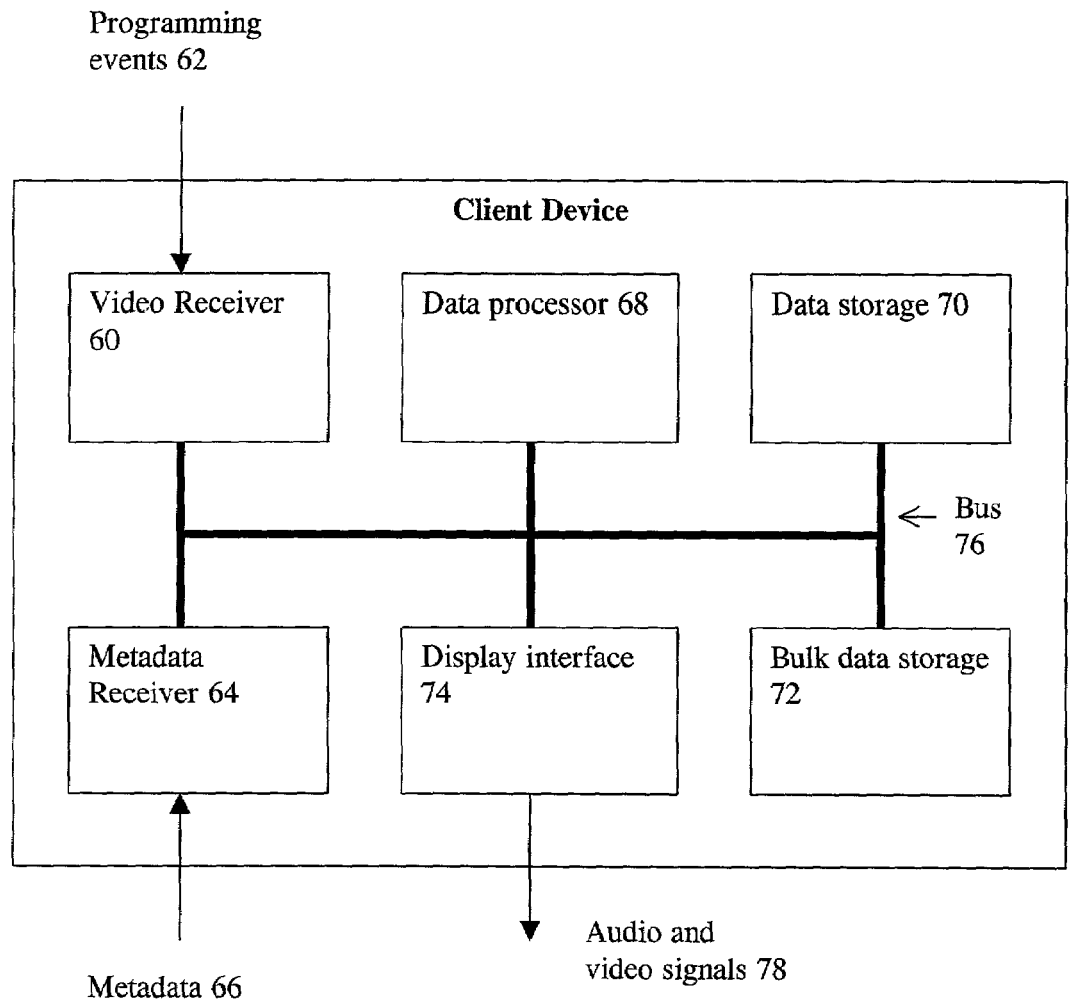
FIG. 10 illustrates a client device in accordance with an embodiment of the invention.

Client devices in accordance with embodiments of the invention are comprised of a data processing device that includes a processor or processors and memory storing one or more viewer profiles, received metadata, and programming instructions that instantiate a client agent that processes metadata to determine programming events that are desirable for viewing or storage in accordance with the viewer profiles. FIG. 10 shows a client device in accordance with a preferred embodiment of the invention. In this preferred embodiment, the client device receives video signals from a broadcast, cable or satellite television provider, data network, or other video source, and receives metadata from a distinct metadata provider such as an internet server. The client device includes a video receiver 60 for receiving and demodulating signals representing programming events 62. Typically the video receiver is a device for demodulating analog or digital video signals. The client device further includes a metadata receiver 64 for receiving metadata 66. Typically the metadata receiver is a device that is capable of communicating with a network for downloading metadata files to the client device. For example, the metadata receiver may be a modem that is programmed to periodically access a remote server where metadata is stored. The client device further comprises a data processor 68 such as a microprocessor, a data storage device 70 such as a RAM or ROM or a combination of the two, and a bulk data storage device 72 such as hard disk storage or optical disk storage. A display interface 74 generates audio and video signals 78 for use by a display device such as a television. The video receiver 60, metadata receiver 64, data processor 68, data storage 70, bulk data storage 72, and display interface 74 are coupled through a bus 76.

As noted above, it is assumed for the preferred embodiment shown in FIG. 10 that the client device receives video signals from a broadcast, cable or satellite television provider, or data network and receives metadata from a distinct metadata provider, and therefore has separate video and metadata receivers. However, in alternative embodiments, both the metadata and programming events may be received by a single receiver. For example, metadata may be transmitted in broadcast provided through broadcast or cable television channels, or may be provided in a text band of a digital video signal such as is provided in the MPEG-2 digital video standard.

Client devices in accordance with preferred embodiments of the invention provide standard EPG information and standard tools such as a program grid and key word searching to allow users to identify programs for viewing or recording, and keyword matching for automatically identifying programs of interest to a viewer. In addition, client devices in accordance with preferred embodiments of the invention analyze metadata to determine desirable upcoming programming events, and may automatically record these programming events, alert the viewer to these programming events, or automatically display these programming events. The desirability of a programming event is determined with respect to viewer preferences represented in one or more viewer profiles stored in the client device. An example of a viewer profile in accordance with preferred embodiments of the invention is provided in FIG. 11. In this viewer profile, a Profile_ID field provides a unique identifier for the profile. A Profile_Name field provides a name for the profile as it will be known to viewers. A Profile_Description field provides a longer description that may be used to provide more detail about the types of programs that the profile is intended to identify. A Profile_Priority field provides a number that indicates the priority of the profile relative to other profiles stored in the client device. A Profile_Alerts_Per_Hour field provides a number of times per hour that an alert is provided to the viewer indicating that a program providing a better fit than the one being viewed is currently available for viewing. A Profile_Alert_Minutes_In_Advance field specifies an amount of time prior to a programming event that a viewer is to be notified of a programming event. A Profile_Activation_Time indicates a time frame during which the profile should be used for analyzing programs. A Category_Scores field contains an identifier and associated preference score for categories in a classification hierarchy for which a preference score has been specified. The preference scores represent a relative degree of interest in each category, with ten indicating the highest level of preference. A variety of storage formats are available for storing the viewer profile. For example, the viewer profile may be stored as an XML document using appropriate tags for indicating the various types of data within the viewer profile.

Figure 12:
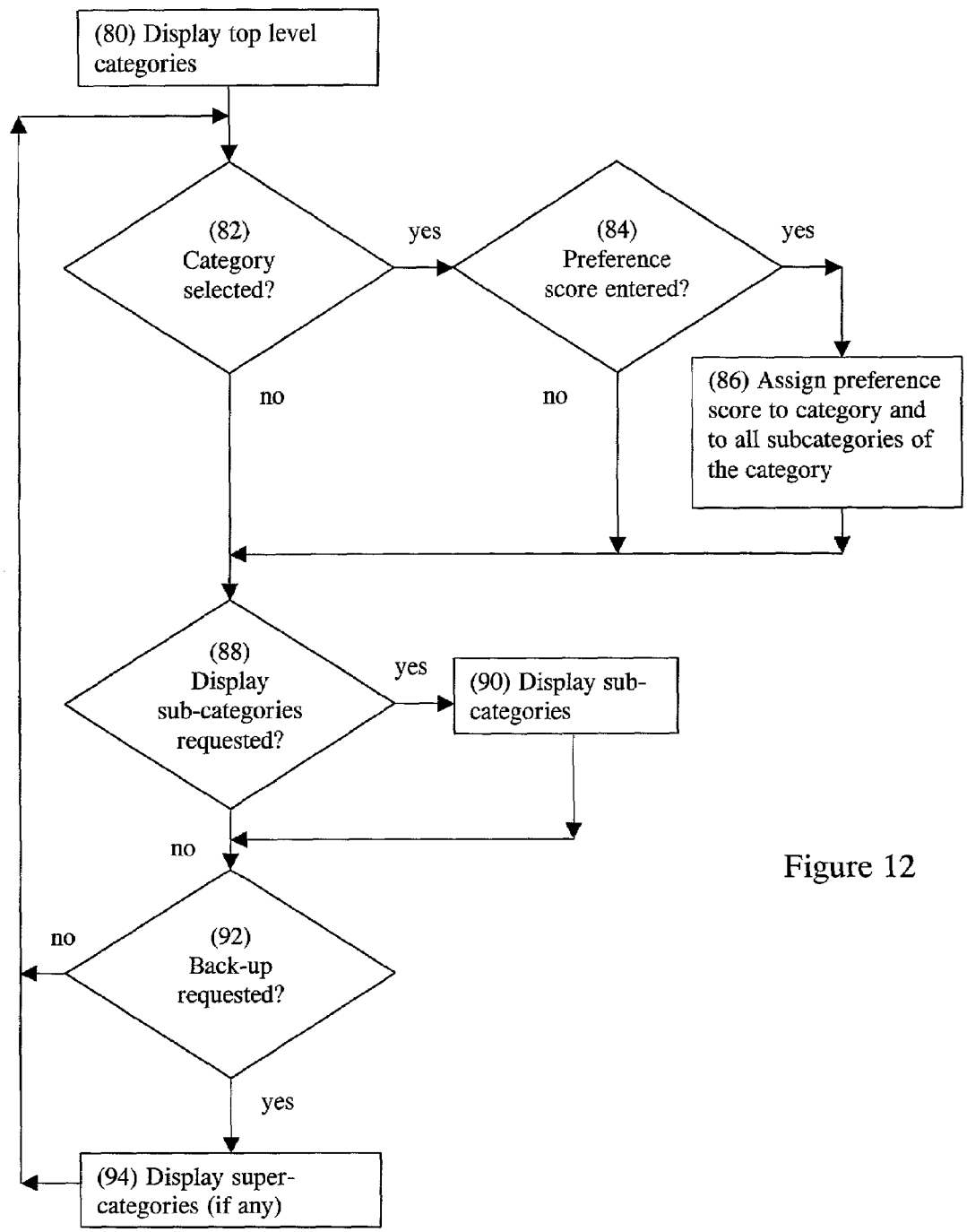
FIG. 12 illustrates a process for producing a viewer profile in accordance with an embodiment of the invention.

The client device is preferably provided with generic viewer profiles that are tailored to different viewing interests such as sports, political news, and other interests. The generic profiles may be pre-programmed in the client device or may be provided to the client device by the metadata provider. The user is preferably enabled to modify or delete the pre-programmed viewer profiles and to configure additional viewer profiles in accordance with particular viewing tastes. Accordingly, the client device is provided with programming instructions for providing an editor enabling the user to create and edit viewer profiles. The profile editor provides a graphical user interface for entering information required for a viewer profile such as the information included in the viewer profile of FIG. 11. In particular, the viewer may enter information such as the profile name, description and priority, alerts per hour, alert minutes in advance, and profile activation time. In addition, the viewer may enter scores for each category in the classification hierarchy. The interface preferably allows the user to navigate through the classification hierarchy structure and to enter scores for categories as desired. FIG. 12 shows an example of processing logic in a client device enabling a user to provide scores for categories in accordance with a preferred embodiment. Initially the top level categories of the classification hierarchy are displayed (80). User input is then monitored. If a category is selected (82), it is next determined whether a preference score for that category has been entered (84). If a preference score is entered, that preference score is assigned to the selected category, and to all subcategories of the selected category (86). In other words, all categories that branch from the selected category are given the same score as the selected category. Therefore, if a category is given a preference score of ten, all of its subcategories will likewise be given a preference score of ten, although of course these can be changed individually. Similarly, if a category is given a preference score of zero, all of its subcategories are likewise given a score of zero.

After entering a preference score, user input monitoring continues. If display of subcategories has been requested (88), the immediate subcategories of the selected category, if any, are displayed (90), and the client returns to monitoring for selection of a category. If back-up to a higher category level has been requested (92), super-categories of the selected category, if any, are displayed (94). Super-categories include the higher category from which the selected category depends, and any other categories that branch from the same category as the higher category. Through this process, the client enables the viewer to navigate the classification hierarchy and assign preference scores to categories in accordance with his viewing tastes.

Figure 13:
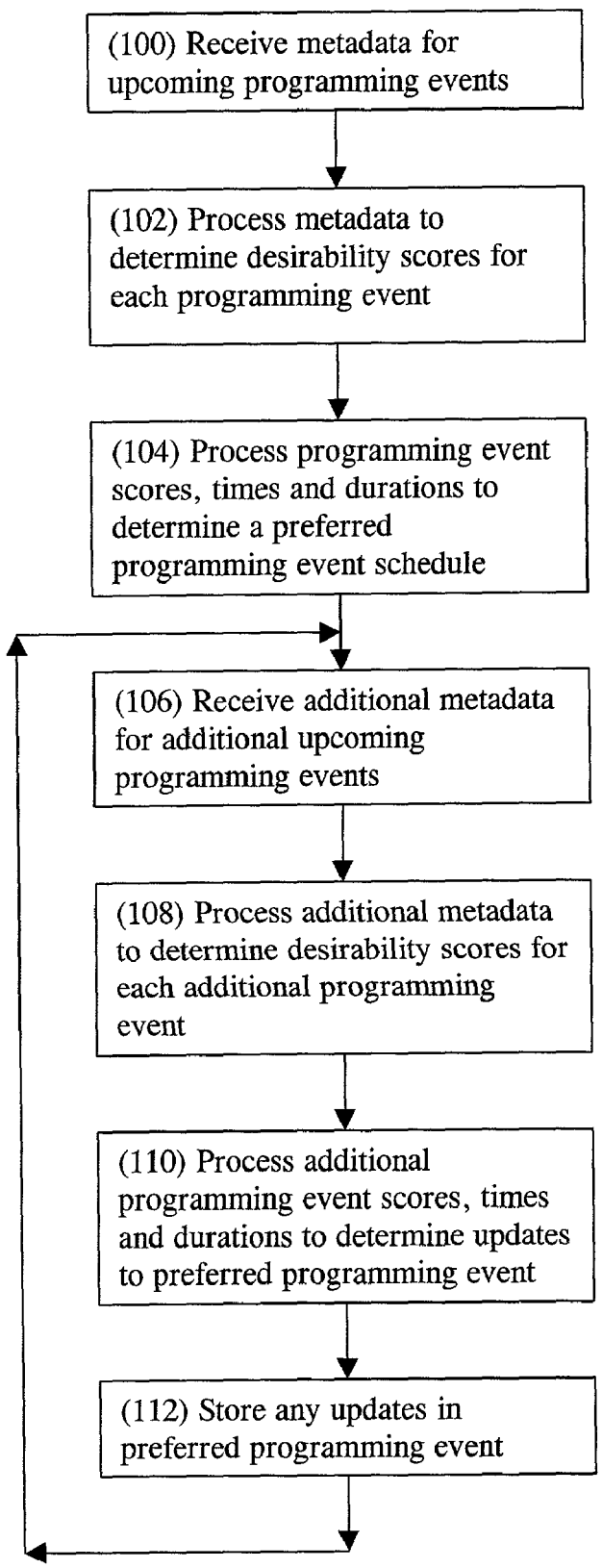
FIG. 13 illustrates a process for producing a preferred programming event schedule in accordance with an embodiment of the invention.

Viewer profiles may be used in processing metadata to build a schedule of desirable programming events that may be automatically recorded, recommended for viewing, or switched to automatically. A schedule building process in a client device in accordance with preferred embodiments is illustrated in FIG. 13. This process assumes that metadata for various programming events becomes available sporadically, and the process therefore involves periodic updating to account for any newly available metadata. Initially, all available metadata for upcoming programming events is received (100). The metadata may be received by connecting to a server and downloading new metadata. Alternatively, metadata may be continuously received through the broadcast system that provides programming events. The metadata is then processed in accordance with one or more viewer profiles to assign desirability scores to each programming event (102). The scores of the programming events along with their times and durations are then processed to determine a preferred programming event schedule (104). The schedule reflects the most desirable non-overlapping available programming events, and preferably stores at least the programming event title, time, duration, and category, and the viewer profile or profiles that resulted in its selection. Generation of the schedule may include a thresholding function whereby a programming event must achieve a minimum desirability score in order to be included in the schedule. Other functions, such as filtering out programming events that have already been recorded or viewed, may also be performed. After the schedule is determined, a periodic updating of the schedule is performed. Particularly, after a given time interval, additional metadata is received (106). The additional metadata typically corresponds to programming events for which no metadata was previously received, but updated metadata may also be received. The additional metadata is processed to determine desirability scores for corresponding programming events (108). The scores, times and durations for those programming events are then processed to determine any updates to the preferred programming event schedule (100). Updates may occur, for example, when a new programming event score is determined to be higher than one in the same time slot that is already stored in the schedule, or when a new programming event occurs in a time slot for which there is no programming event listed in the schedule. After determining any updates, the updates are stored in the preferred programming event schedule (112). The updating process is then repeated at intervals.

Since metadata is assumed to arrive sporadically and may arrive only shortly prior to the time of its corresponding programming event, it is preferable to prioritize the processing of available metadata on the basis of the time remaining until the beginning of the corresponding programming event. This may be determined through reference to time data contained within the metadata.

In conjunction with the scheduling process, the viewer is preferably notified each time a programming event is added to the schedule, and enabled to approve or decline each programming event. This may be accomplished by displaying an icon that may be operated by the viewer to display information about a newly scheduled programming event. Scheduled programming events that have been explicitly approved by the viewer may be treated in the updating process as having a highest possible desirability score, irrespective of the actual score, such that conflicting programming events that have higher scores but were not identified prior to the viewer's approval cannot be substituted in the schedule without explicit viewer approval. In further preferred embodiments of the invention, the user is enabled to manually edit the preferred programming event schedule and to manually schedule programming events for recording. Like viewer-approved programming events, manually scheduled programming events are given priority over later-identified preferred programming events.

Figure 14:
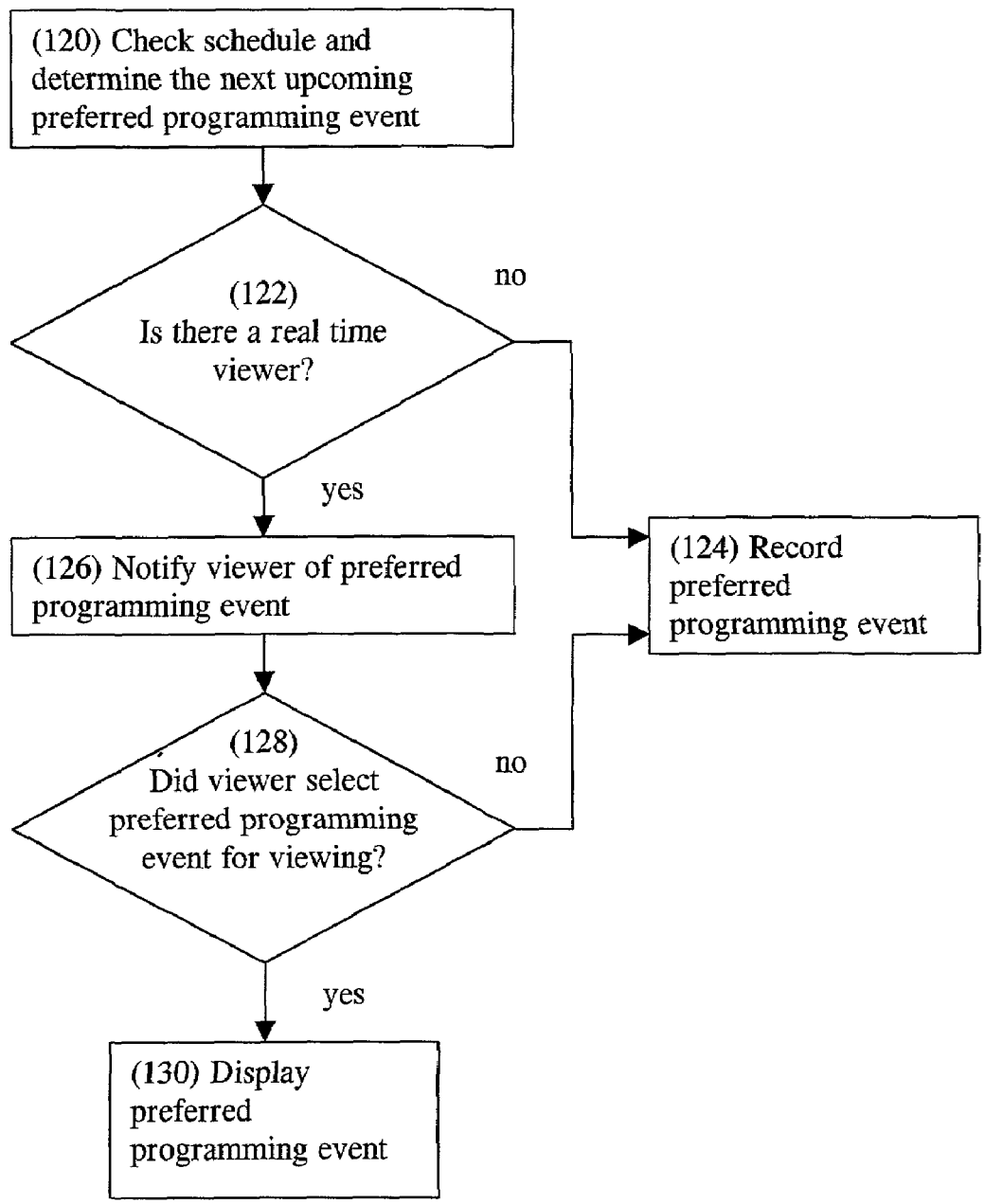
FIG. 14 illustrates a process for selectively notifying a viewer of a programming event and recording a programming event in accordance with an embodiment of the invention.

In preferred embodiments of the invention, the preferred programming event schedule may be used by the client agent to recommend programs for viewing to a real time viewer, and to automatically record programs when no real time viewer is present. A control process performed by the client agent in accordance with preferred embodiments of the invention is shown in FIG. 14. In the illustrated process, it is assumed that the client device includes two RF tuners enabling a real time viewer to receive a first channel for viewing while a second channel may also be received for recording. Initially, the client agent checks the schedule to determine a next upcoming preferred programming event (120). The client agent then determines whether a real time viewer is present (122). If no viewer is present, the preferred programming event is recorded (124), for example, by storage in the bulk data storage device as illustrated in FIG. 10. Alternatively, if there is a real time viewer, the viewer is notified of the upcoming preferred programming event (126). Notice may be provided in various manners, such as generating an audible tone or displaying a banner on the video display device. The time of the notification may be determined with reference to the value in the Profile_Alert_Minutes_In_Advance field of a viewer profile as shown in FIG. 11. If the viewer selects the preferred programming event for viewing (128), the preferred programming event is automatically displayed as soon as it is available for viewing (130). On the other hand, if the viewer does not select the preferred programming event for viewing, the preferred programming event is recorded (124). In alternative embodiments where the client device includes only one RF tuner, the decision by a real time viewer not to view something other than the preferred programming event causes the recording of the preferred programming event to abort. Newly recorded programs are preferably identified in a notification list that may be accessed by the viewer. The notification list may be cleared after each access by the viewer.

Recorded programming events are preferably indicated in a recorded program list from which the user is enabled to select recorded programming events for viewing. Information stored in association with each programming event in the recorded program list preferably includes the time and date of the programming event, the programming event score, the profile that selected the programming event for recording, and the category of the programming event. A user is preferably enabled to sort the recorded program list in accordance with any of these categories of information. The device also preferably provides the option of seamless replay of the recorded programming events in an order chosen in accordance with one of the above categories of information.

As noted above, the client device may determine preferred programming events with respect to one or more viewer profiles. In the case where programming events are recommend for real time viewing, it is preferable that the viewer profiles used by the client device to identify programming events correspond to the preferences of the actual real time viewers. Accordingly, the client device may enable a real-time viewer to specify one or more viewer profiles to be used for identifying programming events of interest during the viewer's viewing session. For example, the viewer may select a particular viewing profile tailored to his tastes while excluding profiles of other viewers who are not present, or the viewer may select a group viewer profile that reflects the collective tastes of present viewers. In alternative embodiments, upon detection of a real time viewer, such as by detecting activation of the video display device or changing of channels, such profiles may be automatically selected by the client device based on indicators of the current real time viewer such as channel selection patterns. In view of these considerations, embodiments that provide both real time viewer suggestions and automatic recording may preferably maintain a first preferred programming schedule for recording purposes based on the full set of viewer profiles maintained by the client device, and may further generate a second preferred programming schedule in accordance with profiles specific to the real time viewer as described above. In such embodiments, conflicts between the two programming schedules are resolved in favor of the real time viewer.

Figure 15:
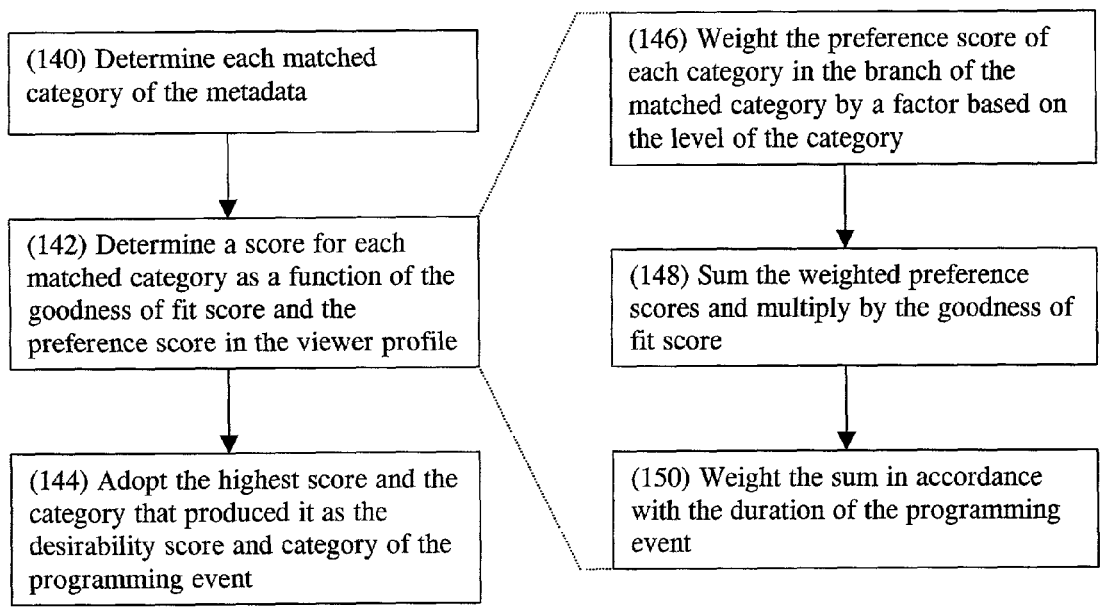
FIG. 15 illustrates a process for assigning a desirability score to a programming event using a viewer profile in accordance with the invention.

The task of determining desirability scores for programming events is performed using the metadata for a programming event and one or more viewer profiles stored in the client device. A process for determining a desirability score for a programming event in accordance with a preferred embodiment of the invention is shown in FIG. 15. In this preferred embodiment, a single viewer profile of the type illustrated in FIG. 11 is used for determining scores for programming events. Referring to the left-hand column of FIG. 15, the process first determines each category of the classification hierarchy that has a goodness of fit score in the metadata and that is assigned a preference score in the viewer profile (140). These categories are referred to herein as matched categories. For purposes of this determination, a category having a preference score that is equal to zero or less than a threshold minimum score may be treated as not having a preference score, and thus the category will not be considered a matched category. For each matched category, a score is determined (142). The score is a function of the goodness of fit score of the matched category and the preference score of the matched category. The score may be weighted in accordance with the specificity of the matched category so that the score increases with the specificity of the matched category. After scores for each matched category are determined, the highest score and the category generating the highest score are adopted as the desirability score and category of the programming event (144).

The function and weighting scheme for generating scores may be implemented in a variety of manner. For example, in an implementation in which the categories of the classification hierarchy are assigned individual specificity weights that increase with the specificity of the category, the score may be calculated as a function of the goodness of fit score, the preference score, and the specificity weight of the matched category. In this manner, the score is influenced by the preference encoded by the viewer in the profile for the matched category, the degree to which the programming event is described by the matched category, and the specificity with which the matched category describes the subject matter of the programming event.

Figure 16:
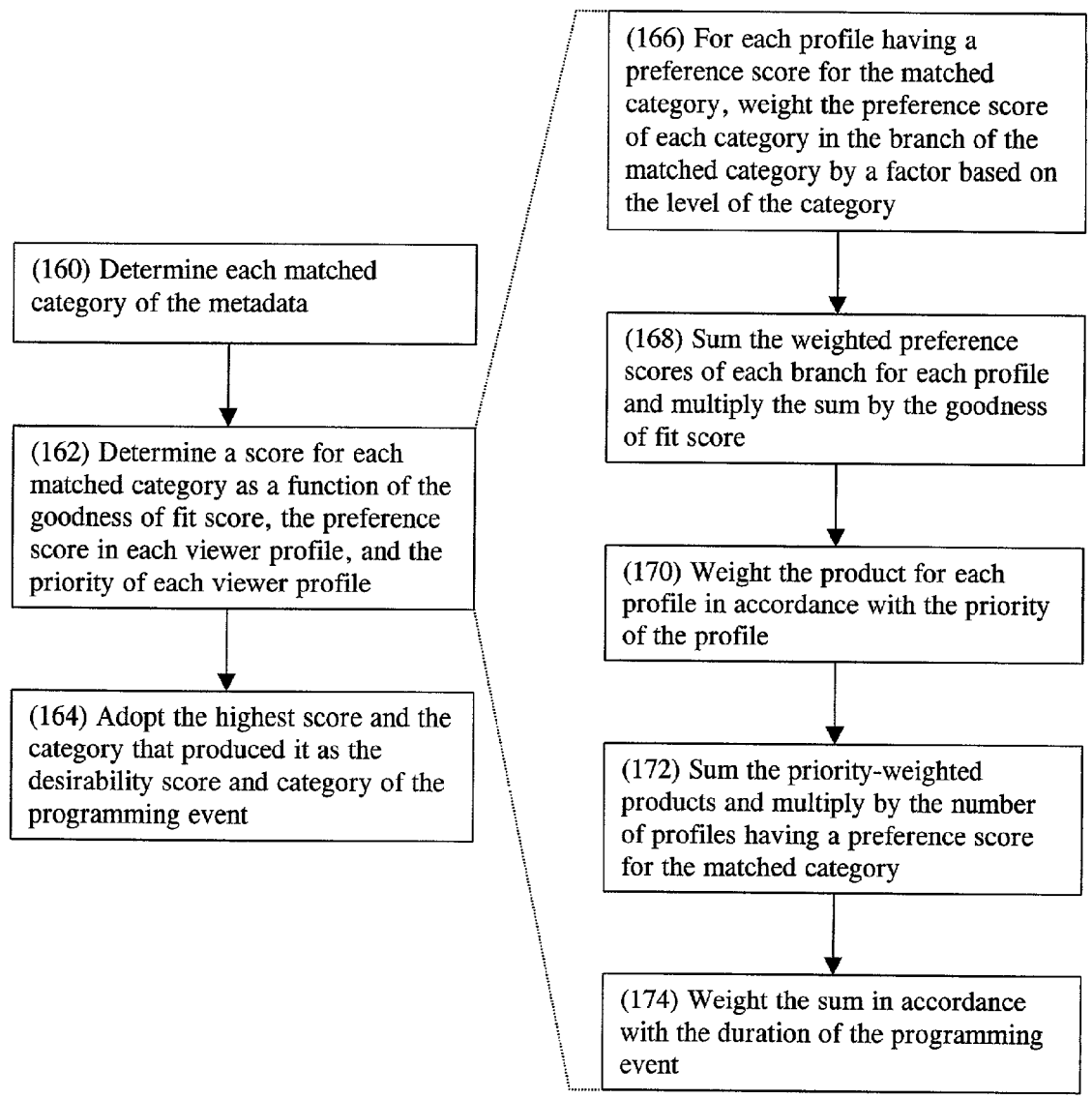
FIG. 16 illustrates a process for assigning a desirability score to a programming event using multiple viewer profiles in accordance with the invention.

In accordance with a preferred embodiment of the invention, a score is calculated as illustrated in the right-hand column of FIG. 15. In this preferred embodiment, the categories of the classification hierarchy are arranged in common ordinal levels, and the level of a category is taken as being representative of its specificity. Thus, in accordance with the preferred embodiment of FIG. 15, the score for a given matched category is calculated by first weighting the preference score of each category in the branch terminating with the matched category by a factor that is based on the level of the category (146). In the preferred embodiment, this weight is calculated as the quantity $e^{N-i}$, where N is the number of ordinal levels in the classification hierarchy and i is the ordinal level of that particular category. The weighted preference scores for all of the categories in the branch are then summed, and the sum is multiplied by the goodness of fit score of the matched category (148). This sum is then weighted in accordance with the duration of the programming event (150), for example, by multiplying the score by 10,000 and adding the duration in seconds of the programming event. Weighting of the score by the program duration serves to resolve conflicts among overlapping programming events that would otherwise have identical scores. The score for each matched category is therefore calculated as:

$$\left(10^4 * S * \sum_{i=1}^{N} P(V_i) * e^{N-i}\right) + d$$

where:
- N=the number of ordinal levels in the classification hierarchy
- $V_i$=a category in the branch of the matched category at level i of the hierarchy
- $P(V_i)$=the preference score of category $V_i$ in the viewer profile
- S=the goodness of fit score of the matched category
- d=the duration of the programming event in seconds In further preferred embodiments, multiple viewer profiles may be used for determining desirability scores for programming events. A process for determining a desirability score for programming events in accordance with a preferred embodiment is shown in FIG. 16. Referring to the left-hand column of FIG. 16, the process first determines each category that has a goodness of fit score in the metadata and that is assigned a preference score in a viewer profile (160). These again are referred to as matched categories, and may omit any categories having a preference score less than a certain minimum value. For each matched category, a score is determined (162). The score is a function of the goodness of fit score of the matched category, the preference score assigned to the matched category in each viewer profile, and a priority of each viewer profile. The score may be weighted in accordance with the specificity of the matched category so that the score increases with the specificity of the matched category. After scores for each matched category are determined, the highest score and the category generating the highest score are adopted as the desirability score and category of the programming event (164).

The function and weighting scheme for generating scores may be implemented in a variety of manner. For example, in an implementation in which the categories of the classification hierarchy are assigned individual specificity weights that increase with the specificity of the category, the score may be calculated as the sum of quantities calculated for each profile, where that quantity is the product of the goodness of fit score, the preference score, a quantity proportional to the priority of the viewer profile, and the specificity weight of the matched category. In this manner, the score is influenced by the preference encoded by the viewer in each profile for the matched category, the degree to which the programming event is described by the matched category, the priority of each profile that included a score for the matched category, and the specificity with which the matched category describes the subject matter of the programming event.

Figure 17:
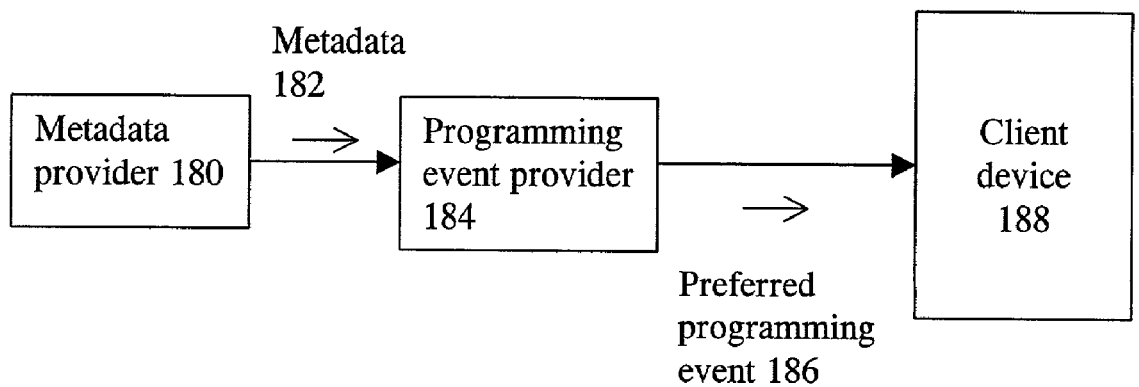
FIG. 17 illustrates a system for providing programming events in accordance with an embodiment of the invention.

In accordance with a preferred embodiment of the invention, the score is calculated as illustrated in the right-hand column of FIG. 16. In this preferred embodiment, the categories of the classification hierarchy are arranged in common ordinal levels, and the level of a category is taken as being representative of its specificity. Thus, in accordance with the preferred embodiment of FIG. 16, the score for a given matched category is calculated by first weighting the preference score of each category in the branch terminating with the matched category by a factor that is based on the level of the category (166). This is done for each profile that includes a preference score for the matched category. In the preferred embodiment, this weight is calculated as the quantity $e^{N-i}$, where N is the number of ordinal levels in the classification hierarchy and i is the ordinal level of that particular category. The weighted preference scores for all of the categories in each branch are then summed for each profile, and these sums are multiplied by the goodness of fit score of the matched category (168). Each of these products is then weighted in accordance with the priority of its profile. In the preferred embodiment, a quantity P is associated with each priority, such that P is greater for higher priority. The weight for a given profile j may then be calculated as the quantity $P_j$ divided by the sum of all Ps corresponding to all profiles having a preference score for the matched category. After priority weighting the product for each profile (170), the priority weighted products are summed together and multiplied by the number of profiles that include a preference score for the matched category (172). This sum is then weighted in accordance with the duration of the programming event (174), for example, by multiplying the score by 10,000 and adding the duration in seconds of the programming event. The score for each matched category is therefore calculated as:

$$\frac{10^4 * S * |I| * \sum_{j=1}^{|I|} P_j \left(\sum_{i=1}^{n} P(V_{ij}) * e^{N-i}\right)}{\sum_{j=1}^{|I|} P_j} + d$$

where:
- N=the number of ordinal levels in the classification hierarchy
- $V_i$=a category in the branch of the matched category at level i of the hierarchy
- $P(V_{ij})$=the preference score of category $V_i$ in profile j
- P(j)=a quantity representing the priority of Profile j
- |I|=number of profiles that include a preference score for the matched category
- S=the goodness of fit score of the matched category
- d=the duration of the programming event in seconds Although the scoring and scheduling processes described above are presented in the context of a client device that analyzes metadata for purposes of identifying upcoming programming events to be recommended or recorded, alternative embodiments of the invention may implement the scoring and scheduling processes in a server of a programming event distribution system that analyzes programming events to determine programming events of interest to particular viewers so that those programming events can be recommended for transmission or automatically transmitted. Such a system is illustrated in FIG. 17, in which a metadata provider 180 supplies metadata 182 to a programming event provider 184, which in turn supplies preferred programming events 186 to a client device 188. In embodiments of this system, the client device may be a set top box, a computer, or a television. The programming event provider may be a broadcast, cable, or satellite television provider system, or an internet server or video server. The programming event provider is typically implemented as a computing device including a processor or processors to execute programming instructions and memory coupled to the processor(s) and containing programming instructions for instantiating a programming event provider system providing programming event scoring and transmission as described further below.

Figure 18:
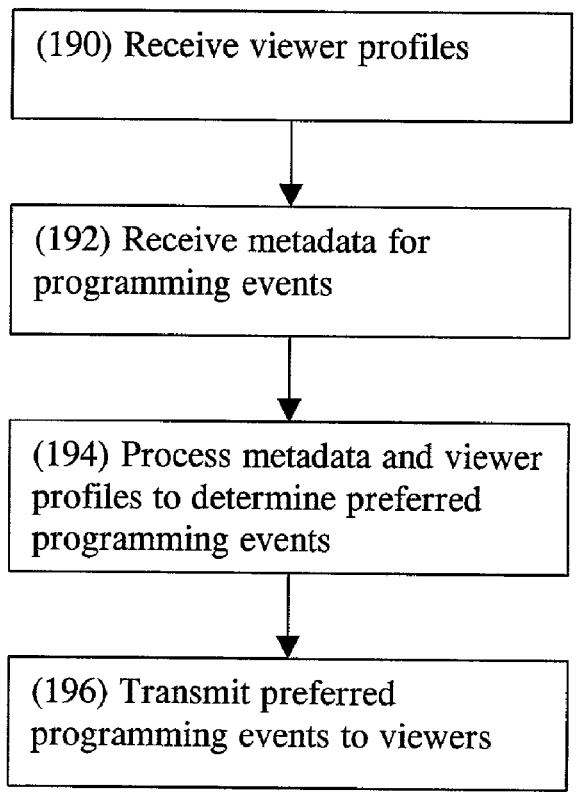
FIG. 18 illustrates a process in a system such as the system shown in FIG. 17.

The programming event provider system may perform scoring or scheduling processes as described above to assign scores to programming events using programming event metadata and viewer profiles provided by one or more consumers. For example, as shown in FIG. 18, the programming event provider may receive one or more viewer profiles from viewers (190). The viewer profiles may be provided, for example, by client devices. As described above, the viewer profiles include preference scores associated with categories of a classification hierarchy. The programming event provider also receives metadata for one or more programming events (192). As described above, the metadata includes goodness of fit scores for categories of the classification hierarchy. Metadata for programming events is processed using the viewer profiles to determine preferred programming events (194). In various embodiments, the metadata may be processed using a single viewer profile to determine preferred programming events for one viewer or a groups of viewers, or the metadata may be processed using multiple viewer profiles to determine preferred programming events for a group of viewers. Preferred programming events are then transmitted to the one or more viewers (196). Transmissions may be provided in accordance with a preferred programming event schedule as described above. Alternatively, an index of preferred programming events may be made accessible to viewer to allow viewers to select programming events for transmission.

Further alternative embodiments of the invention may implement a programming event scoring process in a server that analyzes programming events to determine programming events of particular interest to a viewer and provides alerts regarding the programming events to the viewer through a communication device such as a pager, email, instant messaging, telephone, or wireless communication device to alert the viewer to the availability of the programming event, and to provide related information such as the time and channel of the programming event and a description of the programming event.

Figure 19:
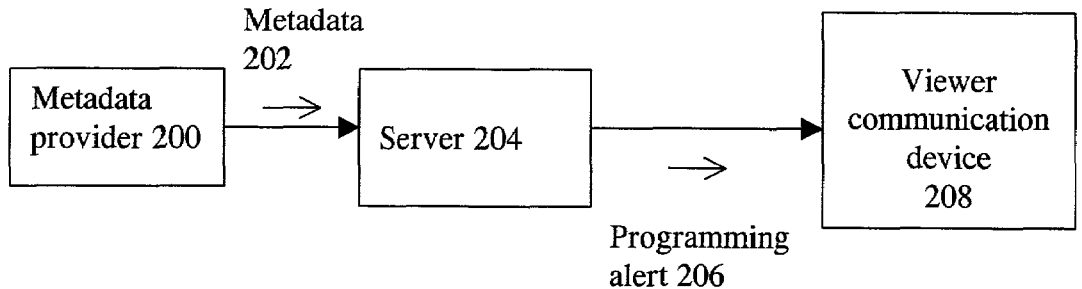
FIG. 19 illustrates a system for providing alerts regarding programming events to viewers in accordance with an embodiment of the invention.
Figure 20:
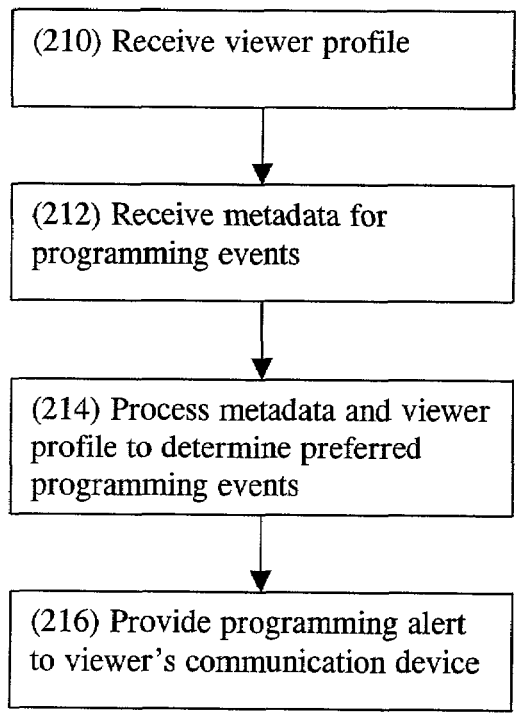
FIG. 20 illustrates a process in a system such as the system shown in FIG. 19.

Such a system is illustrated in FIG. 19, in which a metadata provider 200 supplies metadata 202 to a server 204, which determines preferred programming events in accordance with a viewer profile and communicates programming alerts 206 to a communication device 208 of the viewer. The communication device may for example be a pager, cell phone, wireless communication device, telephone or computer. The server may perform scoring processes as described above to assign scores to programming events using programming event metadata and a viewer profile provided by the viewer. For example, as shown in FIG. 20, the programming event provider may receive a viewer profile from a viewer (210). A viewer may provide a viewer profile, for example, by transmitting a previously established viewer profile to the server through the internet, or by accessing the server through the internet and filling a form to provide appropriate viewer profile information. As described above, the viewer profile may include preference scores associated with categories of a classification hierarchy. The viewer profile preferably contains contact information, such as an email address or pager number, for indicating where an alert should be sent for that viewer. The programming event provider also receives metadata for one or more programming events (212). As described above, the metadata may include goodness of fit scores for categories of the classification hierarchy. Metadata for programming events is processed using the viewer profile to determine preferred programming events (214). An alert is then provided to the viewer's communication device (216). In preferred embodiments the alert is provided to the viewer's communication device using contact information such as an email address or pager address that is included in the viewer profile. The alert may be in the form of a text message for viewing, or in the case of wireless communication devices such as digital cellular telephones, the alert may be provided as a computer-generated spoken message. The manners of transmitting data from a server to various communication devices as described above is known in the art. The time at which the alert is provided is preferably determined through reference to the time of the preferred programming event and information in the viewer profile specifying an amount of time in advance for providing alerts.

Although the processing of the aforementioned embodiment is described as occurring in a server, alternative embodiments may locate the same processing in a viewer's client device, such that the client device receives metadata and processes the metadata to provide programming alerts to a viewer's communication device. The client device in accordance with such embodiments will include an appropriate interface for providing the programming alerts through a desired communication system.

The foregoing description relates to preferred embodiments of the invention. However, those having ordinary skill in the art will recognize a variety of alternative organizations and implementations that fall within the spirit and scope of the invention as defined by the following claims.

What is claimed is:

1. A method in a data processing device for generating metadata that describes the subject matter of segments of a program, comprising:

receiving in the data processing device data corresponding to a program, the data including production data comprising descriptive information and timing information;

analyzing by the data processing device the data to determine individual segments of the program that pertain to different subject matter and the times and durations of the individual segments;

analyzing by the data processing device the data to assign goodness of fit scores for each segment corresponding to subject matter categories of a subject matter classification hierarchy, wherein the subject matter categories of the hierarchy comprise at least a set of top-level categories, sets of first level sub-categories each corresponding to and encompassed by a respective one of said top-level categories, and sets of second level sub-categories each corresponding to and encompassed by a respective one of said first level sub-categories; and storing metadata for each segment, the metadata comprising goodness of fit scores and their associated categories, time data, and descriptive data.

2. The method claimed in claim 1, wherein storing is preceded by determining a representative subset of said goodness of fit scores, and wherein storing goodness of fit scores comprises storing said representative subset of said goodness of fit scores and their associated categories.

3. The method claimed in claim 1, wherein the received data further comprises electronic program guide data.

4. The method claimed in claim 1, wherein determining a time and duration is preceded by processing the production data to conform to a standard delimited format.

5. A program-controlled device for generating metadata that describes the subject matter segments of a program, the device comprising a computer readable medium having stored therein programming instructions for causing the device to perform operations comprising:

receiving data corresponding to a program, the data including production data comprising descriptive information and timing information;

analyzing the data to determine individual segments of the program that pertain to different subject matter and the times and durations of the individual segments;

analyzing the data to assign goodness of fit scores for each segment corresponding to subject matter categories of a subject matter classification hierarchy, wherein the subject matter categories of the hierarchy comprise at least a set of top-level categories, sets of first level sub-categories each corresponding to and encompassed by a respective one of said top-level categories, and sets of second level sub-categories each corresponding to and encompassed by a respective one of said first level sub-categories; and storing metadata for each segment, the metadata comprising goodness of fit scores and their associated categories, time data, and descriptive data.

6. The device claimed in claim 5, wherein said storing is preceded by determining a representative subset of said goodness of fit scores, and wherein storing goodness of fit scores comprises storing said representative subset of said goodness of fit scores and their associated categories.

7. The device claimed in claim 5, wherein the received data further comprises electronic program guide data.

8. The device claimed in claim 5, wherein determining a time and duration is preceded by processing the production data to conform to a standard delimited format.

9. A device for generating metadata that describes the subject matter of segments of a program comprising:

means for receiving data corresponding to a program, the data including production data comprising descriptive information and timing information;

means for analyzing the data to determine individual segments of the program that pertain to different subject matter and the times and durations of the individual segments;

means for analyzing the data to assign goodness of fit scores for each segment corresponding to subject matter categories of a subject matter classification hierarchy, wherein the subject matter categories of the hierarchy comprise at least a set of top-level categories, sets of first level sub-categories each corresponding to and encompassed by a respective one of said top-level categories, and sets of second level sub-categories each corresponding to and encompassed by a respective one of said first level sub-categories; and means for storing metadata for each segment, the metadata comprising goodness of fit scores and their associated categories, time data, and descriptive data.

10. The device claimed in claim 9, further comprising means for determining a representative subset of said goodness of fit scores, and wherein the means for storing goodness of fit scores stores said representative subset of said goodness of fit scores and their associated categories.

11. The device claimed in claim 9, wherein the received data further comprises electronic program guide data.

12. The device claimed in claim 9, further comprising means for processing the production data to conform to a standard delimited format.

\* \* \* \* \*